United States Patent [19]

Kerr et al.

[11] Patent Number: 5,404,291

[45] Date of Patent: Apr. 4, 1995

[54] INVENTORY CONTROL PROCESS FOR RESERVATION SYSTEMS

[75] Inventors: Gordon S. Kerr, Chicago; Todd Snyder, Glendale Heights; Ken Dowling, Arlington Heights; Joyce Willenborg, Oak Park, all of Ill.

[73] Assignee: Hyatt Corp., Chicago, Ill.

[21] Appl. No.: 689,662

[22] Filed: Apr. 23, 1991

Related U.S. Application Data

[63] Continuation of Ser. No. 439,253, Nov. 20, 1989, abandoned.

[51] Int. Cl.$^6$ .............................................. G06F 15/00
[52] U.S. Cl. .................................... 364/407; 364/401; 364/406; 340/825.28; 235/385
[58] Field of Search ............... 364/407, 468, 401, 406; 340/825.28; 235/385

[56] References Cited

U.S. PATENT DOCUMENTS

| | | | |
|---|---|---|---|
| 3,445,633 | 5/1969 | Ratner | 235/381 |
| 3,533,084 | 10/1970 | Cook et al. | 364/900 |
| 3,656,113 | 4/1972 | Lince | 340/825.28 |
| 4,255,619 | 3/1981 | Saito | 379/96 |
| 4,449,186 | 5/1984 | Kelly et al. | 364/407 |
| 4,555,774 | 11/1985 | Bernstein | 364/900 |
| 4,597,045 | 6/1986 | Kiuchi | 364/406 |
| 4,788,643 | 11/1988 | Trippe et al. | 364/407 |
| 4,933,842 | 6/1990 | Durbin et al. | 364/406 |

FOREIGN PATENT DOCUMENTS 2452591 9/1975 Germany .

OTHER PUBLICATIONS

Data Structures Using Pascal, Tenenbaum et al., 1981 by Prentice-Hall, Inc., Englewood Cliffs, N.J. 07632.
MAI Basic Four Hotel System, MAI Basic Four Inc., Tustin, Calif., 1973.
Convention Housing System, William R. McHugh, Inc., 1980.
J&E Hotel management system, Jonas & Erickson Software Technology, Inc., North York, Ontario, Apr. 1983.
Software Sources—The buyer's guide to software, Information Publications Inc., 1988, Hotel Management software listings, 227–8.
Data Sources®, vol. 9, No. 2, Ziff-Davis Publishing Company, New York, Hotel & Restaurant Management applications software program listings, J–386-90, 706–7. 1990.
Datapro® directory of software, Datapro Research, Delran, N.J., published by McGraw-Hill Inc., 1989, Hotel/Motel/Restaurant Management software program listings, D95-125-001-2.
AS/400 Hotel reservation and guest accounting system, IBM, Armonk, N.Y., Sep. 1988.
International application No. PCT/US82/00701, Pitroda; published as WO 83/04327, Dec. 1983.

Primary Examiner—Gail O. Hayes
Assistant Examiner—Frantzy Poinvil
Attorney, Agent, or Firm—Milton S. Gerstein; Marvin Benn

[57] ABSTRACT

A reservations system for hotel chains in which matrix arrays defining maximum rooms for sale, protected inventory, and matrices derived from these two, all by room-type/rate-category combinations. The system provides for generalized control of inventory for sale for an arbitrary number of room-types, rate-categories, etc. The system also allows blocking or protecting inventory by rate-category, room-type, or any combination. The system of the invention allows for either a central or a distributed view of inventory, and allows inventory to be controlled by the property and sold at any location without over-selling. The system of the invention provides the level of control necessary to handle the four major inventory control strategies that the hotel industry will likely require over the next ten years: total control centrally, central indicators and distributed inventory, totally distributed inventory, or a mixed mode of operation utilizing any combination of central or distributed inventory. In each case, the system of the invention provide a common, effective and complete solution.

14 Claims, 3 Drawing Sheets

INVENTORY CONTROL PROCESS FOR RESERVATION SYSTEMS

This is a continuation of application Ser. No. 07/439,253 filed on Nov. 20, 1989, now abandoned.

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

BACKGROUND OF THE INVENTION

Existing inventory systems for hotels today offer a limited capability for managing inventory effectively. Most of these systems are either based on a derivative of an airline seat reservation system, or are scaled-up versions of single property reservations systems. The systems currently used by major hotel chains are basically limited-control, declining inventory systems. They have defined numbers of buckets or inventory counters available for each day of inventory. The systems are limited to less than one year of inventory for a number of technical reasons. Many companies have extended their existing systems to allow for more room-types, and to include additional software to provide some inventory control and inventory blocking. However, these systems cannot provide general inventory availability, but require inventory to be assigned to sub-categories where it remains until reassigned for general inventory use. In addition, the price and rate calculation in these systems is combined with the inventory records, so that physical room-type and rate for the room are directly linked.

Existing systems that derive from single property reservations systems have similar limitations, in that they tend to focus on physical room-types and assign rates to those physical room-types. Inventory is kept by room-type, and limits on number of rates available for sale are usually not provided, except in special cases. When provided, they require additional code customized to the rate-category or the offering, and do not employ a general approach.

Airline systems today have sophisticated yield-management and rate capacity control algorithms. Based on observation of airline rate control practices, the availability of rates is managed by an off-line yield-management system, and rate availability is changed either manually or semi-automatically based on output from the yield-management system. In practical terms, a very large yield-management and rate capacity control operation is required to effectively manage and control availability of rates.

Therefore, current practice for hotel reservations systems can be described as accounting and control of physical room-types, with limited control of rates available for sale for each room-type. There are no existing reservations or inventory control systems in use in hotels or in the travel industry that provide the degree of control by room-type, rate-category or both that the present invention offers.

Other perishable inventory systems where the present invention is applicable would include rental cars, cruise-lines, event-ticketing, and any other application where the combination of a physical item for sale is often secondary to the rate at which that item is sold and the control of the availability of that rate for sale. For instance, in event-ticketing, the price on certain tickets could be changed as the event approaches or as certain other thresholds are met.

SUMMARY OF THE INVENTION

The system of the present invention is ideally suited to an automated link with the yield-management system that recommends and specifies the exact numbers of rates to be made available for sale. Since most yield-management systems tend to focus on opening and closing available rates, reflecting the limitation of existing reservations systems, the present invention provides the best possible target for a sophisticated yield-management system. The information provided by the invention, namely the specific room-type and rate-category counts sold to date, could be passed at any time to a yield-management system, providing far better information about inventory status and maximization of profit.

The system of the invention also allows for either a central or a distributed view of inventory. Current systems tend to use open/closed indicators at the central site, or allocations of inventory from the property. This system allows inventory to be controlled by the property and sold at any location without over-selling. As an example, some hotel chains keep inventory with free sale indicators that are updated manually by the property. When inventory and/or room-types are no longer available for sale, they need to be changed manually by the property. Some chains control all inventory and process all inventory transactions centrally. This approach provides a higher level of control, but incurs very large central operating costs, as well as very high communications costs.

In summary, the system of the invention provides the level of control necessary to handle the four major inventory control strategies that the hotel industry will likely require over the next ten years: total control centrally, central indicators and distributed inventory, totally distributed inventory, or a mixed mode of operation utilizing any combination of central or distributed inventory. In each case, the system of the invention provides a common, effective and complete solution.

BRIEF DESCRIPTION OF THE DRAWING

The invention will be more readily understood with reference to the accompanying drawing, wherein:

FIG. 2 is a flow chart showing the logical steps performed by the system of the invention during the daily selling and updating of inventory of the hotel chain, or the like.

DETAILED DESCRIPTION OF THE INVENTION

In the following, references to the drawings, where applicable, will be indicated in parentheses next to the particular logical step described. The algorithms used to implement the reservation system of the invention utilize a set of matrix data arrays and a set of rules based on the matrix arrays. Each matrix array is composed of i rows representing rate-categories and j columns representing room-types. A different array exists for each inventory-date, and may be differently dimensioned, i.e., each date may have a different number of rate-categories defined, and each season may have different room-types. Six logical arrays are defined as follows:

AA is the maximum number of rooms authorized for sale

A is the number of rooms currently available for sale

S is the number of rooms sold

B is the number of rooms blocked or protected

RB is the number of rooms remaining in a block (still protected)

F is a table of availability flags showing "Open," "Request," or "Closed"

Figure 1A:
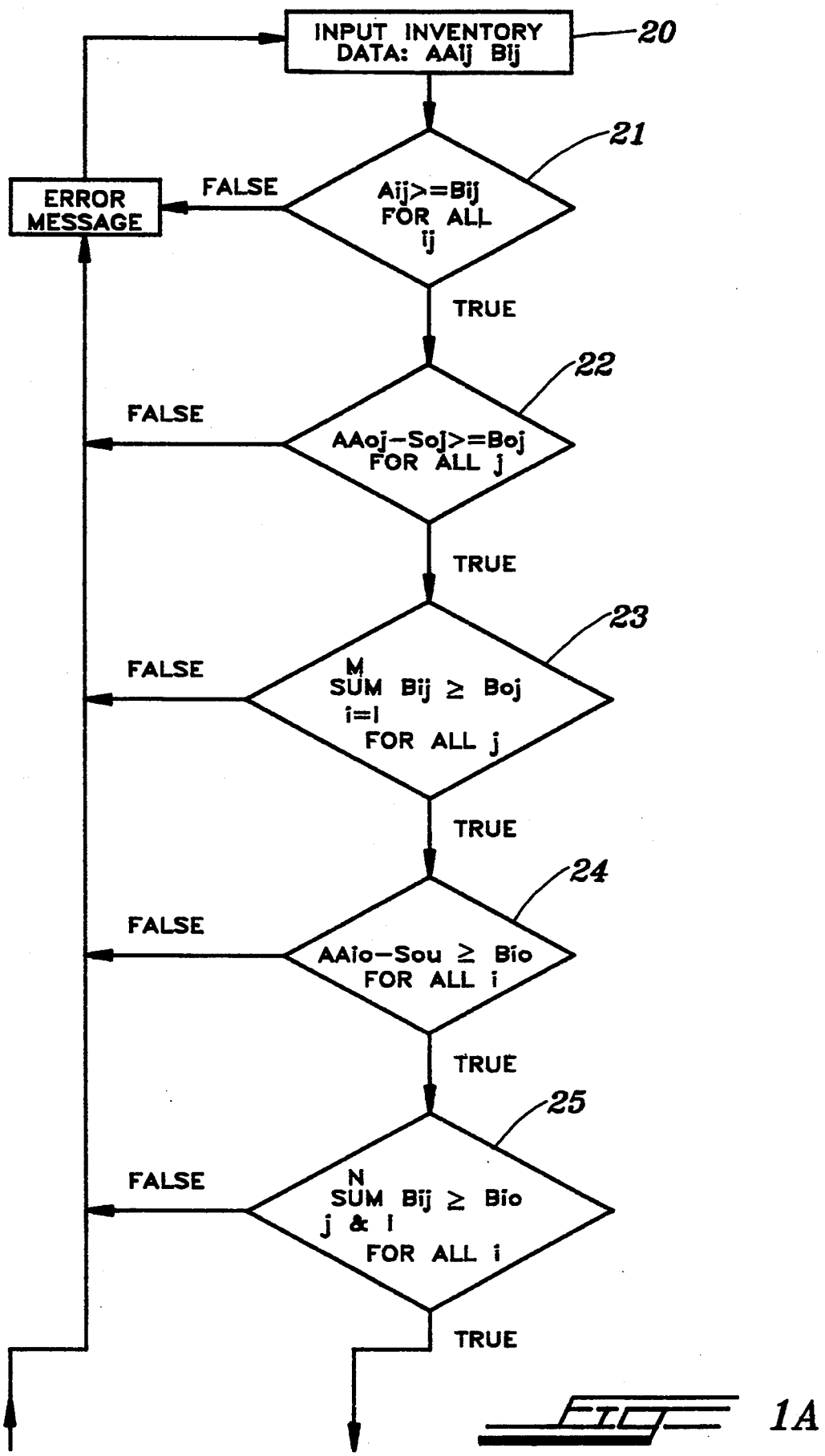
FIG. 1A and 1B are flowcharts showing the initializing of inventory performed according to the system of the invention.
Figure 1B:
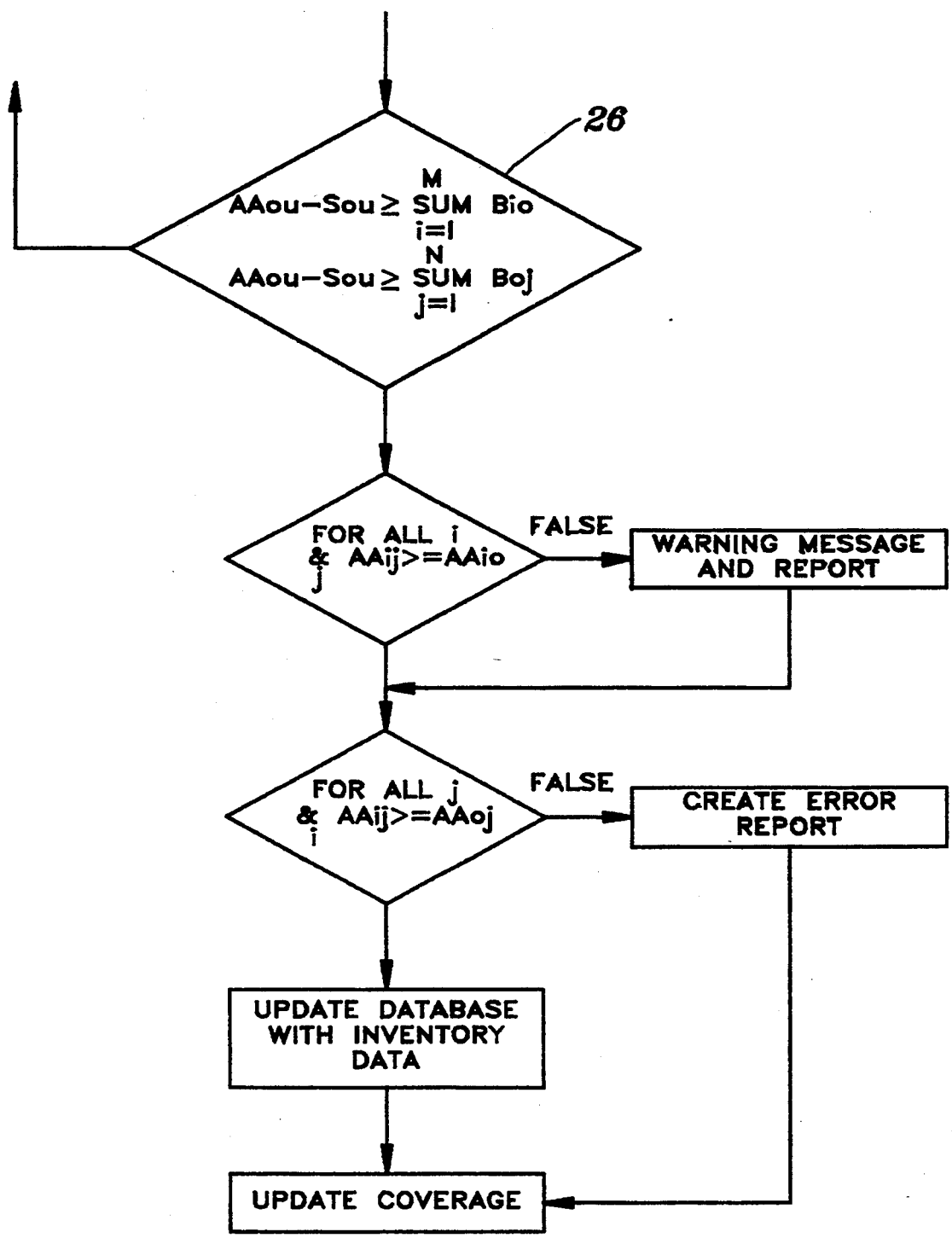

AA and B are set by the reservations-manager (FIG. 1, Block 20). S is updated as rooms are sold or cancelled. A is calculated from number of rooms authorized and number sold. In addition to setting the maximums available for sale in AA, the reservations-manager can protect inventory by specifying a minimum available for a room-type/rate-category combination. The array B contains these minimums. The array RB is calculated from arrays B and S, and indicates the number of rooms remaining to be sold to satisfy blocks. The array F is set automatically based on arrays A and RB.

An arbitrary number of rows may be defined in the arrays for each inventory-date, based on the number of rate-categories available. A rate-category may be a special rate available for a specific group or type of guest (qualified rate) or may be one of many rates generally available (unqualified rate).

Most hotels would have the same room-types year-round, and hence would have the same number of columns. In some cases, a hotel might have seasonal or other reasons to change the number of room-types defined. Recognition of a consistent number of room-types and a variable number of rate-categories is a key element of the system of the invention. This observation is also the key to utilizing relational database methods to manage inventory.

The second key element of the system of the invention is that it allows the reservations-manager to place maximums (limits) and minimums (blocks) on total rooms, rate-categories, room-types, and/or specific combinations of rate and room-type. The user may limit the total number of rooms available for all room-types in a rate-category to be less than the sum of rooms specified as available for all room-types in that rate-category. The user may also limit the number of rooms available for a room-type to be less than the sum of the rooms available for that room-type in all rate-categories. This flexibility allows a reservations-manager to specify maximums available for each rate/room-type combination, and maximums for each rate and room-type, and allow the system to prevent overselling.

The system also allows the reservation-manager to block inventory for specific rate-categories (such as groups or special packages) and specify which room-types may be sold to satisfy the block. Finally, the invention allows the user to set an overall limit on the number of rooms available for each day, which may override the total number of rooms available for all room-types in all rate-categories.

The reservations-manager can specify four levels of limitations or maximums:

$AA_{ij}$ is the maximum that can be sold for a specific rate $AA_{i0}$ is the maximum that can be sold for rate category i $AA_{0j}$ is the maximum that can be sold for a room-type j $AA_{00}$ is the maximum that can be sold for that day The availability matrix array A is calculated from the matrix arrays AA and S, and represents the number of rooms left to sell. According to the invention, the sum of all room-types available for sale in a given rate-category (matrix row-sum) may exceed the maximum allowed for the rate-category. The practical explanation is that many room-types may be sold in the same rate-categories to satisfy customer preference. The advantage of the invention is that the reservations-manager does not need to make a specific, rigid allocation of rooms by physical room-type to a rate-category.

In practice, a warning message would be issued if the reservation manager has not specified enough rooms available for a room-type, a rate-category, or for the day, as follows, it being understood that the term SUM in the following refers to the iterative process associated with matrix analysis:

$$\text{If SUM}_{i<1}^{M} AA_{ij} < AA_{0j}$$

not enough inventory allocated to rate categories 1 to M for room-type j $$\text{If SUM}_{j<1}^{N} AA_{ij} = AA_{i0}$$

not enough inventory allocated to room types 1 to N for rate-category i $$\text{If SUM}_{i<1}^{M} AA_{i0} = AA_{00}$$

not enough inventory allocated to all rate-categories for this day $$\text{If SUM}_{j<1}^{M} AA_{0j} = AA_{00}$$

not enough inventory allocated to all room-types for this day

In general, the reservations-manager would maintain a balanced or slightly oversold condition, so that the following relations would hold:

$$\text{for all } j \quad \text{SUM}_{i \neq 1}^{M} AA_{ij} > AA_{0j}$$

(FIG. 1, Block 29)

$$\text{for all } i \quad \text{SUM}_{j \neq 1}^{N} AA_{ij} \quad AA_{i0}$$

(FIG. 1, Block 28)

If these above-logical relations do not hold, then an error messages will be generated (FIG. 1, Blocks 30, 32).

The system also guards against blocking more inventory than is available. For instance, if a reservations-manager tried to block more inventory in individual rate-categories than was available for a room-type, an error message would be generated (FIG. 1, Block 28). The system forces the following relations to hold:

For all $i$ and $j$   $A_{ij} > B_{ij}$ (FIG. 1, Block 21)

For all $j$   $A_{0j} > B_{0j} = \text{SUM}_{i=1}^{M} B_{ij}$ (FIG. 1, Blocks 22, 23)

For all $i$   $A_{i0} > B_{i0} \leq \text{SUM}_{j=1}^{N} B_{ij}$ (FIG. 1, Blocks 24, 25)

$$\text{SUM}_{j=1}^{N} B_{0j} = A_{00} > \text{SUM}_{i=1}^{M} B_{i0}$$

(FIG. 1, Block 26)

Figure 2:
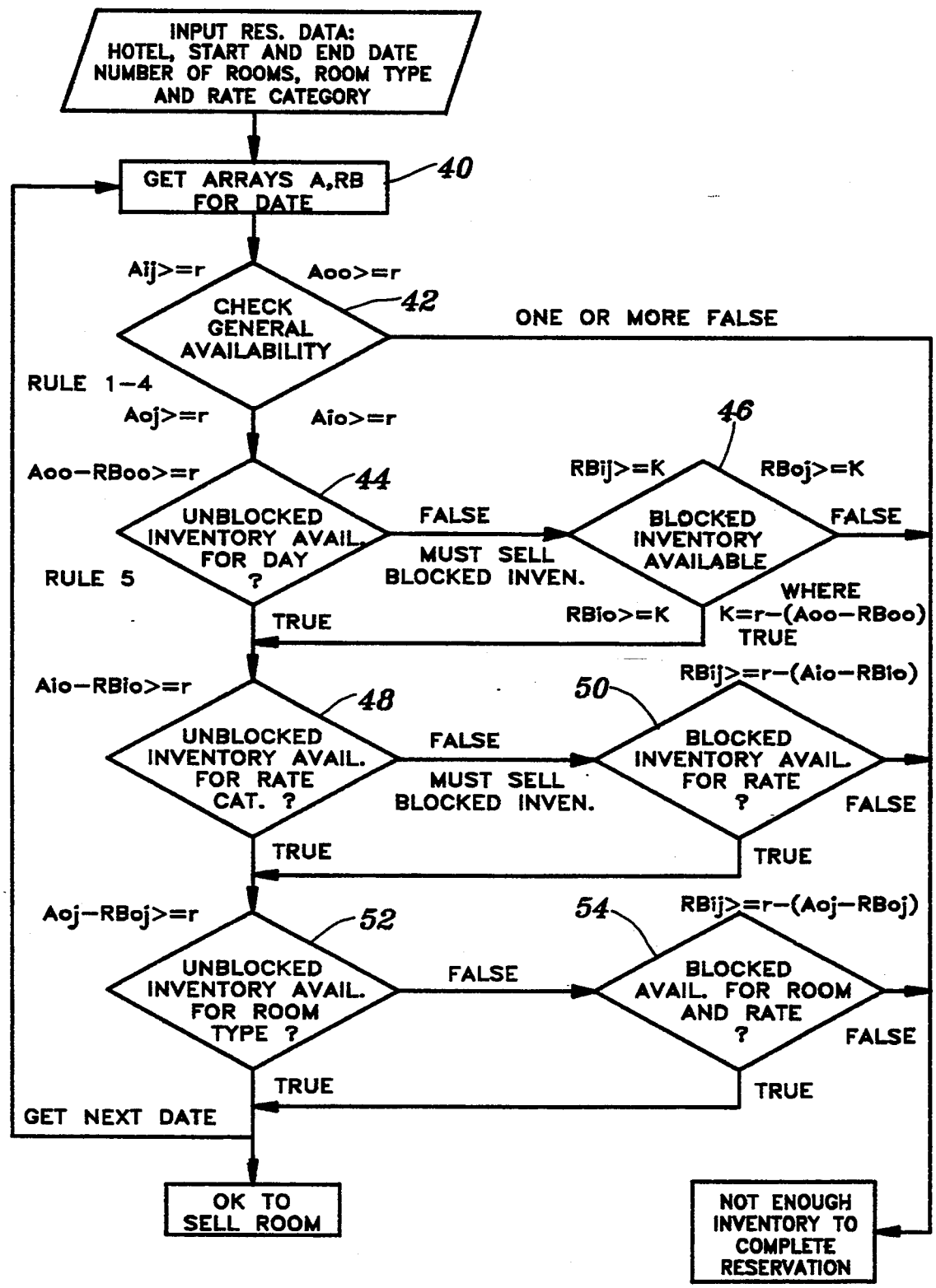

Referring to FIG. 2, in order to satisfy a request for "r" rooms for a span of dates, for room-type i and rate-category j, the following availability-relations must be true for each day (FIG. 2, Block 40, 42):

$A_{ij} > r$ inventory available for this rate/room-type
$A_{i0} > r$ inventory available for this rate-category
$A_{0j} > r$ inventory available for this room-type
$A_{00} > r$ total inventory available Once the general availability of the required number of rooms has been established, additional rules must be applied to ensure that this sale will not violate a block. A block is not considered satisfied until the number of rooms sold is greater than or equal to the number blocked. The elements of the table RB indicate which blocks are still outstanding by calculating remaining blocked inventory as follows:

$$RB_{ij} = \text{MAX}(0, B_{ij} - S_{ij})$$

$$RB_{i0} = \text{MIN}\left(B_{i0}, \text{SUM}_{j=1}^{N} RB_{ij}\right)$$

$$RB_{0j} = \text{MIN}\left(B_{0j}, \text{SUM}_{i=1}^{M} RB_{ij}\right)$$

$$RB_{00} = \text{MIN}\left(B_{00}, \text{SUM}_{i=1}^{M} RB_{i0}, \text{SUM}_{j=1}^{N} RB_{0j}\right)$$

In practice, "overblocking" would not be allowed, so that last relation would be:

$$RB_{00} = \text{SUM}_{i=1}^{M} RB_{i0} = \text{SUM}_{j=1}^{N} RB_{0j}$$

In order to handle blocking in all cases, including overcommitting by rate-category (block $B_{i0}$ rooms for rate-category, and also set $B_{ij}$ to the same number for all room-types checked) the following rules must be applied:

If enough inventory is available for the day, then sell any rate-category; else only free to sell blocked rates.

If $A_{00} - RB_{00} > r$ Then free to sell any rate (FIG. 2, Block 44).

If enough inventory is available for the rate-category or room-type, then free to sell any room-type or rate-category respectively. Otherwise, only sell room-types or rates that have "remaining blocked" inventory (FIG. 2, Block 46).

If $A_{i0} - RB_{i0} > r$ (FIG. 2, Block 48), then free to sell any room-type for rate-category i; otherwise, can only sell blocked room-types in this rate-category (FIG. 2, Block 50).

Similarly, for room-type j.

If $A_{0j} - RB_{0j} > r$ (FIG. 2, Block 52), then free to sell any rate-category in room-type j; otherwise only sell rates with "remaining blocked" inventory (FIG. 2, Block 54).

A request for "r" rooms for a span of days must satisfy all of the following rules for each day:

| General Availability Rules (FIG. 2, Block 42) | | |
|---|---|---|
| 1) | $A_{00} > r$ | Inventory available for total hotel for this day |
| 2) | $A_{i0} > r$ | Inventory available for rate-category $i$ for this day |
| 3) | $A_{0j} > r$ | Inventory available for room-type $j$ for this day |
| 4) | $A_{ij} > r$ | Inventory available for the specific combination of rate-category $i$ and room-type $j$ for this day |

| Protected Inventory Rules (FIG. 2, Blocks 44-54) | | |
|---|---|---|
| 5) | $A_{00} - RB_{00} > r$ | Unblocked inventory available for the day |
|   | or $A_{00} - RB_{00} = r$ | If not, then only blocked inventory can be sold, so blocked inventory must be available for the rate-category, room-type, and combination |
|   | and $RB_{i0} > k$ | |
|   | and $RB_{0j} > k$ | |
|   | and $RB_{ij} > k$ | |
|   | where $k < r - (A_{00} - RB_{00})$ | |
| 6) | $A_{i0} - RB_{i0} < r$ | Unblocked inventory is available for this rate category |
|   | or $A_{i0} - RB_{i0} > r$ | Only blocked inventory available for this rate category, so blocked inventory must be available for the rate/room-type combination |
|   | and $RB_{ij} > r - (A_{i0} - RB_{i0})$ | |
| 7) | $A_{0j} - RB_{0j} > r$ | Unblocked inventory for this room-type |
|   | or $A_{0j} - RB_{0j} > r$ | Only blocked inventory available for this room type, so blocked inventory and must be available for the combination |
|   | and $RB_{ij} > r - (A_{0j} - RB_{0j})$ | |

Availability Flag Process

In most reservation systems, checking for availability of rates and room-types occurs much more often than the inventory sale or cancel process. Therefore, a table can be created that represents the availability status of all rates and room-types which results in a simplified availability checking process. This table can also be used to simplify inventory-handling and availability-checking for distributed inventory and manual systems, while maintaining the advantages of the reservation process of the invention.

The array F contains flags or semaphores that represent the current availability-status determined from the arrays A and RB. Each entry in F indicates "open" or "closed" based on the result of applying availability-rules to A and RB. Certain restrictions are applied when using F to determine current availability. The "open" status indicates that inventory is available for sale, but that "free sale" would be limited to "K" rooms. The constant K represents the free sale limit, or the maximum number of rooms that can be sold against an "open" indicator for each transaction.

The additional status indicator "Request" is used to indicate that inventory may be available, but a complete check is required before a sale can be made. For centralized systems, a complete check means applying all availability rules. For distributed inventory systems, a request must be made to the distributed system.

The flag process provides two key advantages. First, it reduces the overhead associated with checking availability, since availability is checked more often than changed. Second, it provides a consistent view of inventory in a distributed system by maintaining only one copy of the inventory data base. Also, the inventory data base may be kept centrally or may be distributed. In that way, availability can be checked anywhere, in any combination of systems while maintaining a consistent view of inventory to users at all locations.

Since the system of the invention is not affected by the location of the inventory data base, this system could be used for the four typical inventory distribution cases in any combination, as follows:

Centralized—all inventory is kept centrally for all properties, and all transactions are processed centrally.

Central control—inventory is kept centrally, but distributed locations such as properties can process transactions against availability flags.

Distributed—inventory is kept at distributed locations (e.g. properties or regional reservations centers) and availability flags or inventory allocations are maintained at a central location.

Mixed—combinations of all three above based on individual property or chain requirements.

The last mode of operation is the most promising for large hotel chains in the future, where imposing one of the other three modes of operation on all properties would be difficult, time-consuming or expensive. For multi-chain operators, using the best mode of reservations-operation for each chain will reduce operating cost and the development cost associated with "compromise" system solutions.

The system utilizes any conventional mainframe computer system with sufficient memory capacity for the central portion of the system. Minicomputers, microcomputers and personal computers may be utilized for the distributed portion of the system of the invention. Any conventional on-line system may be used for a centralized mode of operation. Other modes could use public or dial networks to implement the system.

A source listing of the computer program that may be stored in the computer memory of the system of the invention is given by way of example in the following Table I.

TABLE I.

```
Nov  9 17:22 1989   parin.per Page 1

DATABASE inv_sql

SCREEN
{

HOTEL CODE      [f000  ]   [f001                                    ]

STARTING DATE [f002       ]       END DATE  [f003      ]

RATE CATEGORY [f004]    [f005                                    ]
}
END

TABLES
hotel
rate_lu
room

ATTRIBUTES
f000 = FORMONLY.propcd,UPSHIFT, REVERSE;
f001 = FORMONLY.htlnm, REVERSE, NOENTRY;
f002 = FORMONLY.stdt TYPE DATE, DEFAULT = TODAY, REVERSE;
f003 = FORMONLY.enddt TYPE DATE, REVERSE;
f004 = FORMONLY.ratecat, UPSHIFT, REVERSE;
f005 = FORMONLY.catdesc, NOENTRY, REVERSE;
END

INSTRUCTIONS
DELIMITERS "  "
END database inv_sql
screen
{

HOTEL CODE [f002 ]  [f003                              ]
```

```
         [f000] [f001                  ]
         [f000] [f001                  ]
         [f000] [f001                  ]
         [f000] [f001                  ]
         [f000] [f001                  ]
         [f000] [f001                  ]
         [f000] [f001                  ]
         [f000] [f001                  ]
         [f000] [f001                  ]
         [f000] [f001                  ]
}
end
tables
rate_lu
attributes
f000 = rate_lu.ratecat, REVERSE, UPSHIFT;
f001 = rate_lu.catdesc, REVERSE, UPSHIFT;
f002 = FORMONLY.propcd, REVERSE, UPSHIFT;
f003 = FORMONLY.htlnm, REVERSE, NOENTRY;
INSTRUCTIONS
DELIMITERS " "
SCREEN RECORD sr[10](ratecat, catdesc)
end database inv_sgl
screen
{
BEGINNING DATE    [f001     ]      ENDING DATE    [f002     ]
BEGINNING DATE    [f001     ]      ENDING DATE    [f002     ]
BEGINNING DATE    [f001     ]      ENDING DATE    [f002     ]
BEGINNING DATE    [f001     ]      ENDING DATE    [f002     ]
BEGINNING DATE    [f001     ]      ENDING DATE    [f002     ]
}
end
tables
rates
attributes
f001 = FORMONLY.begdate, REVERSE, UPSHIFT, REQUIRED;
f002 = FORMONLY.enddate, REVERSE, UPSHIFT, REQUIRED;
end
INSTRUCTIONS
DELIMITERS " "
SCREEN RECORD sc_dater[5](begdate, enddate)
END database inv_sgl
screen
{
        PROPERTY [f000 ]       [f001                           ]

ARRIVAL DATE [f002    ]  DEPARTURE DATE [f003      ]

NUMBER OF ROOMS  [f4]

RATE CATEGORY    [f005]   [f007                        ]

ROOM TYPE        [f006]   [f008                        ]

FORCE ?? (Y/N)   [a]

}
end
tables
hotel
attributes
f000 = FORMONLY.propcd, REVERSE, UPSHIFT;
f001 = FORMONLY.htlnm, REVERSE, NOENTRY;
f002 = FORMONLY.stdt TYPE DATE, DEFAULT = TODAY, REVERSE, UPSHIFT;
f003 = FORMONLY.enddt, REVERSE, UPSHIFT;
f4   = FORMONLY.numrm TYPE SMALLINT, INCLUDE = (1 TO 10), REVERSE, UPSHIFT;
f005 = FORMONLY.ratecat, REVERSE, UPSHIFT;
f006 = FORMONLY.roomtype, REVERSE, UPSHIFT;
f007 = FORMONLY.catdesc, REVERSE, NOENTRY;
f008 = FORMONLY.typedesc, REVERSE, NOENTRY;
```

```
    a    = FORMONLY.force TYPE CHAR, INCLUDE = (Y,N), DEFAULT = "N",
            REVERSE, UPSHIFT;
end
INSTRUCTIONS
DELIMITERS " "
END

DATABASE FORMONLY

SCREEN
{

ENTER THE MAXIMUM AUTHORIZED FOR EACH ROOM TYPE:

[f006|f006|f006|f006|f006|f006|f006|f006|f006|f006|f006|f006|f006|f006|f006]

[f013|f013|f013|f013|f013|f013|f013|f013|f013|f013|f013|f013|f013|f013|f013]

}
END

ATTRIBUTES
f006 = FORMONLY.roomtype, REVERSE, NOENTRY;
f013 = FORMONLY.rmmax TYPE SMALLINT, REVERSE;
END
INSTRUCTIONS
DELIMITERS " "
SCREEN RECORD sc_rmty[15] (roomtype)
SCREEN RECORD sc_max[15] (rmmax)
END

DATABASE FORMONLY

SCREEN
{

HOTEL CODE      [f000 ]  [f001                                  ]

STARTING DATE  [f002        ]       END DATE  [f003      ]

MAXIMUM NUMBER OF ROOMS THAT CAN BE SOLD A DAY      [f011]

}
END

ATTRIBUTES
f000 = FORMONLY.propcd, UPSHIFT, REVERSE;
f001 = FORMONLY.htlnm, REVERSE, NOENTRY;
f002 = FORMONLY.stdt TYPE DATE, DEFAULT = TODAY, REVERSE, UPSHIFT;
f003 = FORMONLY.enddt TYPE DATE, REVERSE, UPSHIFT;
f011 = FORMONLY.rmauth TYPE SMALLINT, REVERSE;
END
INSTRUCTIONS
DELIMITERS " "
END database inv_sgl
screen
{

PROPERTY CODE [f000 ] [f004                              ]

ROOM
       ROOM      ROOM DESCRIPTION           COUNT
        [f001]  [f002                    ]  [f003]
        [f001]  [f002                    ]  [f003]
        [f001]  [f002                    ]  [f003]
        [f001]  [f002                    ]  [f003]
        [f001]  [f002                    ]  [f003]
        [f001]  [f002                    ]  [f003]
        [f001]  [f002                    ]  [f003]
        [f001]  [f002                    ]  [f003]
```

```
        [f001] [f002                     ] [f003]
        [f001] [f002                     ] [f003]
}
end
tables
room
attributes
f000 = FORMONLY.propcd, UPSHIFT, REVERSE;
f001 = FORMONLY.roomtype, UPSHIFT, REVERSE;
f002 = FORMONLY.typedesc, UPSHIFT, REVERSE;
f003 = FORMONLY.rmcount, UPSHIFT, REVERSE;
f004 = FORMONLY.htlnm, UPSHIFT, REVERSE, NOENTRY;
end
INSTRUCTIONS
DELIMITERS " "
SCREEN RECORD sc_rm[10](roomtype, typedesc, rmcount)
END DATABASE inv_sql SCREEN
{
HOTEL CODE      [f000 ]             [f001                        ]
STARTING DATE   [f002      ]        END DATE  [f003     ]
RATE CATEGORY   [f004]              [f005                         ]

DATE    DAY   MAX [f006|f006|f006|f006|f006|f006|f006|f006|f006|f006]TOTAL
[f007  ] [a0 ] [f008|f009|f010|f011|f012|f013|f014|f015|f016|f017|f018]
[f007  ] [a0 ] [f008|f009|f010|f011|f012|f013|f014|f015|f016|f017|f018]
[f007  ] [a0 ] [f008|f009|f010|f011|f012|f013|f014|f015|f016|f017|f018]
[f007  ] [a0 ] [f008|f009|f010|f011|f012|f013|f014|f015|f016|f017|f018]
[f007  ] [a0 ] [f008|f009|f010|f011|f012|f013|f014|f015|f016|f017|f018]
[f007  ] [a0 ] [f008|f009|f010|f011|f012|f013|f014|f015|f016|f017|f018]
[f007  ] [a0 ] [f008|f009|f010|f011|f012|f013|f014|f015|f016|f017|f018]
[f007  ] [a0 ] [f008|f009|f010|f011|f012|f013|f014|f015|f016|f017|f018]
[f007  ] [a0 ] [f008|f009|f010|f011|f012|f013|f014|f015|f016|f017|f018]
[f007  ] [a0 ] [f008|f009|f010|f011|f012|f013|f014|f015|f016|f017|f018]
[f007  ] [a0 ] [f008|f009|f010|f011|f012|f013|f014|f015|f016|f017|f018]
[f007  ] [a0 ] [f008|f009|f010|f011|f012|f013|f014|f015|f016|f017|f018]
[f007  ] [a0 ] [f008|f009|f010|f011|f012|f013|f014|f015|f016|f017|f018]
}
END

TABLES
hotel
rate
room

ATTRIBUTES
f000 = formonly.propcd,UPSHIFT, REVERSE;
f001 = formonly.htlnm, REVERSE, NOENTRY;
f002 = formonly.stdt TYPE DATE, DEFAULT = TODAY, REVERSE;
f003 = formonly.enddt TYPE DATE, REVERSE;
f004 = formonly.ratecat, UPSHIFT, REVERSE;
f005 = formonly.catdesc, NOENTRY, REVERSE;
f006 = formonly.rmtype, NOENTRY, REVERSE;
f007 = formonly.invdate, NOENTRY, REVERSE;
a0   = formonly.invday, NOENTRY, REVERSE;
f008 = formonly.r_count1, NOENTRY, REVERSE;
f009 = formonly.r_count2, NOENTRY, REVERSE;
f010 = formonly.r_count3, NOENTRY, REVERSE;
f011 = formonly.r_count4, NOENTRY, REVERSE;
f012 = formonly.r_count5, NOENTRY, REVERSE;
f013 = formonly.r_count6, NOENTRY, REVERSE;
f014 = formonly.r_count7, NOENTRY, REVERSE;
f015 = formonly.r_count8, NOENTRY, REVERSE;
f016 = formonly.r_count9, NOENTRY, REVERSE;

f017 = formonly.r_count10, NOENTRY, REVERSE;
f018 = formonly.realtot, NOENTRY, REVERSE;
END
```

```
INSTRUCTIONS
DELIMITERS " "
SCREEN RECORD sc_rmtype[9] (rmtype)
SCREEN RECORD sc_count[14] (invdate thru realtot)
END {
: Module:      bang.4gl
:
: Function:    bang()
:
: Purpose:     Run a unix command without exiting from application.
:
:
: Author:      Ken Dowling
:
:              By        Date            Action
: Revisions:
:
: HYATT CONFIDENTIAL
: Copyright (C) 1989
:
}
FUNCTION bang()

DEFINE cmd CHAR(80)

PROMPT "!" FOR cmd
        RUN cmd
        CALL mess("Press Return to continue. . .")

END FUNCTION

{
: Module:      bigsum.4gl
:
: Function:    colchk()
:
: Purpose:     To sum the columns after input of room and category
:              information and to produce warnings report where the
:              the entered inventory does not meet the "secret formulas"
:
: Author:      Ken Dowling
:
:              By        Date            Action
: Revisions:
:
: HYATT CONFIDENTIAL
: Copyright (C) 1989
:
}
DATABASE inv_sgl GLOBALS
        "glob.4gl"

FUNCTION colchk()

DEFINE   sumauth          SMALLINT,
         sumblock         SMALLINT,
         sumsold          SMALLINT,
         sumrem           SMALLINT,
         maxauth          SMALLINT,
         dt               INTEGER,
         big    RECORD
                  propcd          LIKE inven.propcd,
                  maxdate         DATE,
                  mindate         DATE
                END RECORD,
         rm_arr ARRAY[14] OF CHAR(4),
         x, ar_row, siz_rm, lc    SMALLINT LET ar_row = 1
```

```
   DECLARE x_curs CURSOR FOR
         SELECT *
         FROM t_big

DECLARE r_curs CURSOR FOR
         SELECT roomtype
         FROM room
         WHERE room.propcd = big.propcd FOREACH x_curs INTO big.*

IF status = NOTFOUND THEN
        RETURN
END IF

FOREACH r_curs INTO rm_arr[ar_row]
        LET ar_row = ar_row + 1
END FOREACH

LET siz_rm = ar_row
LET rm_arr[siz_rm] = "*MAX"

FOR x = 1 TO siz_rm
   FOR dt = big.maxdate TO big.mindate

SELECT SUM(auth), SUM(block), SUM(sold)
            INTO sumauth, sumblock, sumsold
            FROM inven
            WHERE invdate = dt
            AND propcd = big.propcd
            AND ratecat != "*MAX"
            AND inven.roomtype = rm_arr[x]

LET sumrem = sumblock - sumsold

UPDATE inven
            SET (block,remblock) = (sumblock, sumrem)
            WHERE invdate = dt
            AND propcd = big.propcd
            AND ratecat = "*MAX"
            AND inven.roomtype = rm_arr[x]

SELECT auth INTO maxauth
            FROM inven
            WHERE invdate = dt
            AND propcd = big.propcd
            AND ratecat = "*MAX"
            AND inven.roomtype = rm_arr[x]

IF sumauth < maxauth THEN
            IF lc = 0 THEN
                  START REPORT sumerr TO "sum.err"
                  LET lc = lc + 1
            END IF OUTPUT TO REPORT sumerr(big.propcd, DATE(dt), rm_arr[x], sumauth, ma
      END IF

END FOR
END FOR

END FOREACH

IF lc != 0 THEN
      FINISH REPORT sumerr
END IF

DROP TABLE t_big

# RESET GLOBAL VARIABLE cmm TO "N" TO SHOW THAT THE TEMP TABLE t_big DOES
# NOT EXIST

LET cmm = "N"
```

```
        END FUNCTION

REPORT sumerr(rpt)

DEFINE rpt RECORD
            propcd              LIKE hotel.propcd,
            dt                  DATE,
            roomtype            LIKE room.roomtype,
            sumauth             SMALLINT,
            maxauth             SMALLINT
            END RECORD ORDER EXTERNAL BY rpt.dt FORMAT
            PAGE HEADER
                    PRINT "DATA ERRORS RESULTING FROM SUMMING THE COLUMNS"
                    PRINT COLUMN 2, "PROPERTY",
                            COLUMN 14, "DATE",
                            COLUMN 24, "ROOMTYPE",
                            COLUMN 36, "SUM ROOMTYPE",
                            COLUMN 52, "MAX AUTH"

SKIP 1 LINE

ON EVERY ROW
                    PRINT rpt.propcd,
                            COLUMN 12, rpt.dt,
                            COLUMN 27, rpt.roomtype,
                            COLUMN 38, rpt.sumauth,
                            COLUMN 52, rpt.maxauth

SKIP 1 LINE

END REPORT

{
    : Module:       blck_rm.4gl
    :
    : Function:     blck_rm()
    :
    : Purpose:      Checks to see if the room being sold is one from
    :               from blocked inventory.
    :
    : Author:       Ken Dowling
    :
    :               By          Date            Action
    : Revisions:
    :
    : HYATT CONFIDENTIAL
    : Copyright (C) 1989
    :
    }
    DATABASE inv_sgl GLOBALS
          "glob.4gl"

FUNCTION blck_rm(siz_sel)

DEFINE x, y             SMALLINT,
           siz_sel          SMALLINT

LET y = 1

FOR x = 1 TO siz_sel
       IF ( x != 1 ) THEN
          IF ( rminfo[x].invdate = rminfo[x-1].invdate ) THEN
             IF ( rminfo[x].remblock = 0 ) THEN
                LET blkrm[y] = "N"
             END IF
          ELSE
             LET y = y + 1
             IF ( rminfo[x].remblock = 0 ) THEN
```

```
                    LET blkrm[y] = "N"
                END IF
            END IF
        ELSE
            IF ( rminfo[x].remblock = 0 ) THEN
                LET blkrm[y] = "N"
            END IF
        END IF

END FOR

END FUNCTION

{
: Module:     cancel:4gl
:
: Function:   cancel()
:
: Purpose:    To check rooms available and call function to decrement
:             or increment inventory.
:
: Author:     Ken Dowling
:
:                By        Date           Action
: Revisions:
:
: HYATT CONFIDENTIAL
: Copyright (C) 1989
:
}
DATABASE inv_sgl GLOBALS
       "glob.4gl"

DEFINE  blk_can ARRAY[28] OF DATE,
        siz_can    SMALLINT,
        siz_blk    SMALLINT FUNCTION cancel()

DEFINE  ar_row                SMALLINT,
        x, i                  SMALLINT,
        upsel                 SMALLINT DECLARE s_curs CURSOR FOR
        SELECT rowid, ratecat, roomtype, invdate,
               auth, avail, block, remblock, sold
        FROM inven
        WHERE propcd = sel.propcd
        AND invdate >= sel.stdt
        AND invdate < sel.enddt
        AND (ratecat = "*MAX" OR ratecat = sel.ratecat)
        AND (roomtype = "*MAX" OR roomtype = sel.roomtype)
        ORDER BY invdate LET ar_row = 1

FOREACH s_curs INTO rminfo[ar_row].*
        LET ar_row = ar_row + 1
END FOREACH LET siz_can = ar_row - 1
LET i = 1
INITIALIZE blk_can[1] TO NULL FOR x = 1 TO siz_can
        IF rminfo[x].roomtype != "*MAX" AND rminfo[x].ratecat != "*MAX" AND
               rminfo[x].block - rminfo[x].sold >= 0 THEN
                        LET blk_can[i] = rminfo[x].invdate
                        LET i = i + 1
        END IF
END FOR
```

```
IF i != 1 THEN
        LET siz_blk = i - 1
END IF

#  THIS IS A VERY INEFFICIENT WAY TO DO THIS BUT AT THE PRESENT MOMENT
#  I CAN'T THINK OF A DIFFERENT WAY.  SO. . .

IF blk_can[1] IS NOT NULL THEN

#  FOR ROOMS BEING RETURNED TO BLOCKED INVENTORY

FOR x = 1 TO siz_can
        FOR i = 1 TO siz_blk
                LET upsel = mmax(0,rminfo[x].sold - sel.numrm)
                IF rminfo[x].invdate = blk_can[i] THEN
                        UPDATE inven
                                SET(avail, remblock, sold) =
                                (rminfo[x].avail + sel.numrm,
                                        rminfo[x].remblock + sel.numrm, upsel)
                                WHERE rowid = rminfo[x].rowid
                ELSE
                        UPDATE inven
                                SET(avail, sold) =
                                (rminfo[x].avail + sel.numrm, upsel)
                                WHERE rowid = rminfo[x].rowid
                END IF
        END FOR
END FOR
ELSE

#  FOR ROOMS WHICH WILL NOT BE RETURNED AS BLOCK ROOMS

        FOR x = 1 TO siz_can
                LET upsel = mmax(0,rminfo[x].sold - sel.numrm)

IF rminfo[x].invdate = blk_can[i] THEN
                        UPDATE inven
                                SET(avail, remblock, sold) =
                                (rminfo[x].avail + sel.numrm,
                                        rminfo[x].remblock + sel.numrm, upsel)
                                WHERE rowid = rminfo[x].rowid
                ELSE
                        UPDATE inven
                                SET(avail, sold) =
                                (rminfo[x].avail + sel.numrm, upsel)
                                WHERE rowid = rminfo[x].rowid
                END IF
        END FOR
END IF {
: Module:     display.4gl
:
: Function:   disarray()
:
: Purpose:    To display information pertaining to inventory
:             information.
:
: Author:     Ken Dowling
:
:             By          Date            Action
: Revisions:
:
: HYATT CONFIDENTIAL
: Copyright (C) 1989
:
}
DATABASE inv_sgl FUNCTION disarray(act)
```

```
DEFINE  dis RECORD
            propcd          LIKE hotel.propcd,
            stdt            DATE,
            enddt           DATE
        END RECORD,
            disval          CHAR(1),
            htlnm           LIKE hotel.htlnm,
            act             CHAR(1)

OPEN WINDOW mtrx_w AT 1,1 WITH FORM "mtrx"

LET int_flag = 0

INPUT BY NAME dis.*

AFTER FIELD propcd
        CALL val_tbl("hotel", dis.propcd)
            RETURNING dis.propcd, htlnm IF dis.propcd IS NULL THEN
            CALL mess("Invalid Property Code.")
            NEXT FIELD propcd
        ELSE
            DISPLAY BY NAME htlnm
        END IF BEFORE FIELD stdt
        CALL prep_rate(dis.propcd)

AFTER FIELD stdt
        IF dis.stdt IS NULL THEN
            LET dis.stdt = TODAY
            DISPLAY dis.stdt TO FORMONLY.stdt
        END IF AFTER FIELD enddt
        IF dis.enddt < dis.stdt THEN
            CALL mess("Invalid Date, Must be greater than or equal to start c
            NEXT FIELD enddt
        ELSE
            IF dis.enddt IS NULL THEN
                LET dis.enddt = dis.stdt
                DISPLAY BY NAME dis.enddt
            END IF
        END IF ON KEY (F6)
        CASE
            WHEN INFIELD (propcd)
                CALL get_tbl("hotel")
                    RETURNING dis.propcd, htlnm
                IF dis.propcd IS NOT NULL THEN
                    DISPLAY BY NAME dis.propcd, htlnm
                    NEXT FIELD stdt
                END IF
        END CASE

END INPUT

IF int_flag = 0 THEN

OPEN WINDOW sel_w AT 8,12 WITH 3 ROWS, 55 COLUMNS ATTRIBUTE (BORDER)
        MENU "Values"
            COMMAND "Authorized" "View current authorized room values"
                LET disval = "A"
                CALL arr_load(dis.*, disval, act)

COMMAND KEY(V) "aVailable" "View current available room values"
                LET disval = "V"
                CALL arr_load(dis.*, disval, act)

COMMAND "Block" "View current block room values"
                LET disval = "B"
                CALL arr_load(dis.*, disval, act)
```

```
                    COMMAND "Remaining Block" "View current remaining block values"
                          LET disval = "R"
                          CALL arr_load(dis.*, disval, act)

COMMAND "Sold" "View current sold room values"
                        . LET disval = "S"
                          CALL arr_load(dis.*, disval, act)

COMMAND "Exit" "Exit from menu and return to the main menu"
                          LET int_flag = 0
                          EXIT MENU
           END MENU CLOSE WINDOW sel_w CLOSE WINDOW mtrx_w ELSE
            CALL mess("Interrupt entered; data discarded.")
            LET int_flag = 0
            CLOSE WINDOW mtrx_w
     END IF

END FUNCTION

{
: Module:      gen_avl.4gl
:
: Function:    gen_avl()
:
: Purpose:     Checks general availability for the length of stay.
:              Rules 1 thru 4.
:
: Author:      Ken Dowling
:
:              By         Date           Action
: Revisions:
:
: HYATT CONFIDENTIAL
: Copyright (C) 1989
:
}
DATABASE inv_sgl GLOBALS
       "glob.4gl"

FUNCTION gen_avl(siz_sel)

DEFINE x              SMALLINT,
       ln_count       SMALLINT,
       siz_sel        SMALLINT,
       pratt          SMALLINT,
       cont           SMALLINT,
       ans            CHAR(1)

# prompt attempt -- set to 1 if prompt occurs, so prompt will only occur once.
LET pratt = 0
LET ln_count = 0
LET cont = 0

# RULES 1 THRU 4:
#     Aij >=r
#     Aoj >=r
#     Aio >=r
#     Aoo >=r
# CHECKING THE REVERSE (NEGATIVE) OF HOW THE RULES ARE STATED:
#     r>= Aij
#     r>= Aoj
#     r>= Aio
#     r>= Aoo

FOR x = 1 TO siz_sel
       IF sel.numrm > rminfo[x].avail THEN
              IF ln_count = 0 THEN
```

```
                    RUN "> temp.list"
                    START REPORT reserr TO "temp.list"
                    LET ln_count = ln_count + 1
                END IF OUTPUT TO REPORT reserr(1,rminfo[x].*, sel.*)

IF sel.force NOT MATCHES "Y" AND pratt = 0 THEN
                    PROMPT "Force sell? (Y/ ) " FOR ans
                    LET pratt = 1
                END IF
            END IF
        IF ans NOT MATCHES "[Yy]" THEN
            LET cont = 100
            CALL mess("No forced sell.")
            EXIT FOR
        END IF
END FOR RETURN cont

END FUNCTION

{
: Module:     get_array.4gl
:
: Function:   arr_load(lupropcd, stdt, enddt, disval)
:             disp(zday, dval)
:             dismenu()
:             cls(zday)
:
: Purpose:    Displays array to screen with menu to select the next day
:             or previous day.
:
: Author:     Ken Dowling
:
:             By          Date            Action
: Revisions:
:
: HYATT CONFIDENTIAL
: Copyright (C) 1989
:
}
DATABASE inv_sgl DEFINE  in_arr ARRAY[14,200,50] OF RECORD
            ratecat         LIKE inven.ratecat,
            roomtype        LIKE inven.roomtype,
            invdate         LIKE inven.invdate,
            auth            LIKE inven.auth
        END RECORD,
        {
        x = ROOMTYPES
        y = RATE CATEGORIES
        z = DATES
        } inx ARRAY[50] OF SMALLINT,
        iny ARRAY[50] OF SMALLINT,
        inz SMALLINT FUNCTION arr_load(lupropcd, stdt, enddt, disval, act)

DEFINE  lupropcd            LIKE hotel.propcd,
        stdt, enddt         DATE,
        disval              CHAR(1),
        val                 CHAR(8),
        dval                CHAR(20),
        sell                CHAR(200),
        x, y, z             SMALLINT,
        lc                  SMALLINT,
        act                 CHAR(1)
```

```
# DETERMINE WHICH TO DISPLAY AUTH, AVAIL, BLOCK, SOLD

# val IS THE VARIABLE WHICH REPRESENTS THE TABLE NAME FOR BUILDING THE
# SELECT STATEMENT

# dval IS THE VARIABLE REPRESENTS THE INFORMATION DISPLAYED ON THE
# SCEEN AND dval AS WELL AS THE DATE ARE ALSO DISPLAYED ON THE SCREEN
# TO LET THE USER KNOW WHICH MATRIX AND WHICH DATE ARE ON THE SCREEN.

CASE disval
        WHEN "A"
                LET val = "auth"
                LET dval = "AUTHORIZED"
        WHEN "V"
                LET val = "avail"
                LET dval = "AVAILABLE"
        WHEN "B"
                LET val = "block"
                LET dval = "BLOCK"
        WHEN "R"
                LET val = "remblock"
                LET dval = "REMAINING BLOCK"
        WHEN "S"
                LET val = "sold"
                LET dval = "SOLD"
        OTHERWISE
                CALL mess("Invalid value for display.")
                RETURN
END CASE LET sell = " SELECT ratecat, roomtype, invdate,",val CLIPPED,"",
        " FROM inven ",
        " WHERE inven.propcd = \"",lupropcd CLIPPED,"\"",
        " AND inven.invdate >= \"",stdt CLIPPED,"\"",
        " AND inven.invdate <= \"",enddt CLIPPED,"\"",
        " ORDER BY invdate, ratecat, roomtype"

LET x = 1
LET y = 1
LET z = 1
LET inx[z] = 1
LET iny[z] = 1
LET inz = 1

PREPARE in_curs FROM sell

FOREACH in_curs INTO in_arr[x,y,z].*

IF act = "R" THEN

IF lc = 0 THEN
                START REPORT mtrx_rep TO "mtrx.list"
                LET lc = 1
        END IF OUTPUT TO REPORT mtrx_rep(in_arr[x,y,z].*)

END IF

IF x != 1 THEN
CASE
        WHEN in_arr[x-1,y,z].invdate != in_arr[x,y,z].invdate
                LET in_arr[1,1,z+1].* = in_arr[x,y,z].*
                INITIALIZE in_arr[x,y,z].* TO NULL
                LET inx[z] = x + 1
                LET iny[z] = y + 1
                LET inz = inz + 1
                LET z = z + 1
                LET y = 1
                LET x = 2

WHEN in_arr[x-1,y,z].ratecat != in_arr[x,y,z].ratecat
                LET in_arr[1,y+1,z].* = in_arr[x,y,z].*
                INITIALIZE in_arr[x,y,z].* TO NULL
                LET inx[z] = x - 1
```

```
                    LET iny[z] = y + 1
                    LET x = 2
                    LET y = y + 1

OTHERWISE
                    LET x = x + 1

END CASE
ELSE
          LET x = x + 1
END IF

END FOREACH

IF act = "R" THEN
          FINISH REPORT mtrx_rep
ELSE
          CALL dismenu(dval)
END IF

END FUNCTION

FUNCTION disp(zday, dval)

DEFINE    x,y               SMALLINT,
          zday              SMALLINT,
          dval              CHAR(20),
          rm                ARRAY[14] OF CHAR(4),
          dis               ARRAY[200] OF RECORD
                    auth1   SMALLINT,
                    auth2   SMALLINT,
                    auth3   SMALLINT,
                    auth4   SMALLINT,
                    auth5   SMALLINT,
                    auth6   SMALLINT,
                    auth7   SMALLINT,
                    auth8   SMALLINT,
                    auth9   SMALLINT,
                    auth10  SMALLINT,
                    auth11  SMALLINT,
                    auth12  SMALLINT,
                    auth13  SMALLINT,
                    auth14  SMALLINT
          END RECORD LET y = 1
LET x = 1

DISPLAY in_arr[x,y,zday].invdate, dval TO disdate, disval

FOR x = 1 TO inx[zday]
          IF in_arr[x,y,zday].roomtype IS NOT NULL THEN
                    LET rm[x] = in_arr[x,y,zday].roomtype
                    DISPLAY in_arr[x,y,zday].roomtype TO sc_rm[x].*
          END IF
END FOR LET x = 1
LET y = 1

FOR y = 1 TO iny[zday]
FOR x = 1 TO inx[zday]
          CASE
                    WHEN in_arr[x,y,zday].roomtype = rm[1]
                              LET dis[y].auth1 = in_arr[x,y,zday].auth
                    WHEN in_arr[x,y,zday].roomtype = rm[2]
                              LET dis[y].auth2 = in_arr[x,y,zday].auth
                    WHEN in_arr[x,y,zday].roomtype = rm[3]
                              LET dis[y].auth3 = in_arr[x,y,zday].auth
                    WHEN in_arr[x,y,zday].roomtype = rm[4]
                              LET dis[y].auth4 = in_arr[x,y,zday].auth
                    WHEN in_arr[x,y,zday].roomtype = rm[5]
                              LET dis[y].auth5 = in_arr[x,y,zday].auth
                    WHEN in_arr[x,y,zday].roomtype = rm[6]
```

```
                                     LET dis[y].auth6 = in_arr[x,y,zday].auth
                         WHEN in_arr[x,y,zday].roomtype = rm[7]
                                LET dis[y].auth7 = in_arr[x,y,zday].auth
                         WHEN in_arr[x,y,zday].roomtype = rm[8]
                                LET dis[y].auth8 = in_arr[x,y,zday].auth
                         WHEN in_arr[x,y,zday].roomtype = rm[9]
                                LET dis[y].auth9 = in_arr[x,y,zday].auth
                         WHEN in_arr[x,y,zday].roomtype = rm[10]
                                LET dis[y].auth10 = in_arr[x,y,zday].auth
                         WHEN in_arr[x,y,zday].roomtype = rm[11]
                                LET dis[y].auth11 = in_arr[x,y,zday].auth
                         WHEN in_arr[x,y,zday].roomtype = rm[12]
                                LET dis[y].auth12 = in_arr[x,y,zday].auth
                         WHEN in_arr[x,y,zday].roomtype = rm[13]
                                LET dis[y].auth13 = in_arr[x,y,zday].auth
                         WHEN in_arr[x,y,zday].roomtype = rm[14]
                                LET dis[y].auth14 = in_arr[x,y,zday].auth
                END CASE
        END FOR
END FOR LET x = 1
FOR y = 1 TO iny[zday]
        IF in_arr[x,y,zday].ratecat IS NOT NULL THEN
                IF y > 0 AND y <= 10 THEN
                        DISPLAY in_arr[x,y,zday].ratecat TO sc_rt[y].*
                        DISPLAY dis[y].* TO sc_av[y].*
                END IF
        END IF
END FOR CALL SET_COUNT(iny[zday])

END FUNCTION

FUNCTION dismenu(dval)

DEFINE  x,y     SMALLINT,
        zday    SMALLINT,
        tx,ty   SMALLINT,
        mx,my   SMALLINT,
        dval    CHAR(20)

LET zday = 1

CURRENT WINDOW IS mtrx_w

CALL disp(zday, dval)

MENU "Date"

COMMAND "Next day" "Display records for the next day"
                IF zday = inz THEN
                        CALL mess("No more dates to display.")
                        NEXT OPTION "Previous day"
                ELSE
                        CALL cls(zday)
                        LET zday = zday + 1
                        CALL disp(zday,dval)
                END IF COMMAND "Previous day" "Display records for the Previous day"
                IF zday = 1 THEN
                        CALL mess("No more dates to display.")
                        NEXT OPTION "Next day"
                ELSE
                        CALL cls(zday)
                        LET zday = zday - 1
                        CALL disp(zday,dval)
                END IF COMMAND "Exit" "Return to previous menu"
                EXIT MENU

END MENU
```

```
CURRENT WINDOW IS sel_w
END FUNCTION

FUNCTION cls(zday)

DEFINE zday     SMALLINT,
       x,y      SMALLINT

FOR x = 1 TO inx[zday]
        CLEAR sc_rm[x].*
END FOR

FOR y = 1 TO iny[zday]
        CLEAR sc_av[y].*
        CLEAR sc_rt[y].*
END FOR

END FUNCTION

REPORT mtrx_rep(rep_arr)

DEFINE  x, y, z SMALLINT,
        rep_arr RECORD
                ratecat         LIKE inven.ratecat,
                roomtype        LIKE inven.roomtype,
                invdate         LIKE inven.invdate,
                auth            LIKE inven.auth
        END RECORD ORDER EXTERNAL BY rep_arr.invdate, rep_arr.ratecat

FORMAT

BEFORE GROUP OF rep_arr.invdate
                FOR x = 1 TO inx[1]
                        PRINT in_arr[x,1,1].roomtype," ";
                END FOR ON EVERY ROW
        PRINT rep_arr.*

END REPORT

DATABASE inv_sgl

GLOBALS
        DEFINE maxdt    DATE
        DEFINE mindt    DATE
        DEFINE cmm      CHAR(1)

# 7 DAYS MAXIMUM LENGTH OF STAY ARRAY MUST BE 28 FOUR THE FOUR
        # VALUES PULLED FOR EACH DAY.

DEFINE  rminfo ARRAY[28] OF RECORD
                rowid           INTEGER,
                ratecat         LIKE rate_lu.ratecat,
                roomtype        LIKE room.roomtype,
                invdate         LIKE inven.invdate,
                auth            LIKE inven.auth,
                avail           LIKE inven.avail,
                block           LIKE inven.block,
                remblock        LIKE inven.remblock,
                sold            LIKE inven.sold
                END RECORD,
        sel     RECORD
                propcd          LIKE hotel.propcd,
                stdt            DATE,
                enddt           DATE,
                numrm           SMALLINT,
                ratecat         LIKE rate_lu.ratecat,
                roomtype        LIKE room.roomtype,
                force           CHAR(1)
                END RECORD,
```

```
        blkrm       ARRAY[28] OF CHAR(1), # Y IF ROOM IS FROM BLOCKED INVENTORY
        blksell     ARRAY[28] OF CHAR(1), # Y IF SELL MUST BE A BLOCKED ROOM
        siz_sel     SMALLINT

END GLOBALS

{
: Module:      inprates.4gl
:
: Function:    inrate()
:
: Purpose:     input rates for specified hotel and dates
:
:
: Author:      Ken Dowling
:
:              By         Date           Action
: Revisions:
:
: HYATT CONFIDENTIAL
: Copyright (C) 1989
:
}
DATABASE inv_sql DEFINE  dt ARRAY[10] OF RECORD
        begdate         DATE,
        enddate         DATE
        END RECORD, dac             SMALLINT FUNCTION inrate(rate)

DEFINE  inp ARRAY[60] OF RECORD
        ratecat         LIKE rates.ratecat,
        sgl             LIKE rates.sgl,
        dbl             LIKE rates.dbl,
        xp              LIKE rates.xp,
        child           LIKE rates.child,
        taxyn           LIKE rates.taxyn,
        commyn          LIKE rates.commyn,
        commamt         LIKE rates.commamt,
        minocc          LIKE rates.minocc,
        maxocc          LIKE rates.maxocc
        END RECORD, rate RECORD
        ratetype        LIKE typerate.ratetype,
        propcd          LIKE hotel.propcd
        END RECORD, maxarray        SMALLINT,
        scrnarray       SMALLINT,
        x,y             SMALLINT,
        ac,sr,cr        SMALLINT,
        accnt           SMALLINT,
        anyvalue        CHAR(30)                # dummy variable LET maxarray = 60
LET scrnarray = 10

FOR x = 1 TO maxarray
        INITIALIZE inp[x].* TO NULL
END FOR

INPUT ARRAY inp
        FROM sc_monrt.*

BEFORE ROW, INSERT
        LET ac = ARR_COUNT()
        LET cr = ARR_CURR()
        LET sr = SCR_LINE()
```

```
AFTER ROW, DELETE
        LET ac = ARR_COUNT()
        LET cr = ARR_CURR()
        LET sr = SCR_LINE()

BEFORE FIELD ratecat
        CALL prep_rate(rate.propcd)

AFTER FIELD ratecat
        IF inp[cr].ratecat IS NULL THEN
                INITIALIZE inp[cr].* TO NULL
                DISPLAY inp[cr].* TO sc_monrt[sr].*
        ELSE
        CALL val_rate("rate_lu", inp[cr].ratecat)
                RETURNING inp[cr].ratecat, anyvalue
        IF inp[cr].ratecat IS NULL THEN
                CALL mess("Invalid rate category.")
                NEXT FIELD ratecat
        ELSE
                DISPLAY inp[cr].ratecat TO sc_monrt[sr].ratecat
                NEXT FIELD sgl
        END IF
        END IF AFTER FIELD sgl
        IF inp[cr].sgl IS NULL THEN
                CALL mess("A value must be entered.")
                NEXT FIELD sgl
        END IF AFTER FIELD taxyn IF inp[cr].taxyn IS NULL THEN
                CALL mess("A value must be entered.")
                NEXT FIELD taxyn
        END IF AFTER FIELD commyn
        IF inp[cr].commyn IS NULL THEN
                CALL mess("A value must be entered.")
                NEXT FIELD commyn
        END IF IF inp[cr].commyn = "N" THEN
                NEXT FIELD minocc
        END IF AFTER FIELD commamt
        IF inp[cr].commyn = "Y" AND inp[cr].commamt IS NULL THEN
                CALL mess("Amount must be entered.")
                NEXT FIELD commamt
        END IF
        IF inp[cr].commyn = "N" THEN
                CALL mess("No commission can be entered.")
                INITIALIZE inp[cr].commamt TO NULL
                DISPLAY inp[cr].commamt TO sc_monrt[sr].commamt
                NEXT FIELD minocc
        END IF BEFORE FIELD minocc
        IF inp[cr].commamt > 99.99 THEN
                CALL mess("Commission value is to large.")
                NEXT FIELD commamt
        END IF AFTER FIELD minocc
        IF inp[cr].minocc IS NULL THEN
                CALL mess("Value must be entered.")
                NEXT FIELD minocc
        END IF AFTER FIELD maxocc
        IF inp[cr].maxocc IS NULL THEN
                CALL mess("Maximum occupancy must be entered.")
                NEXT FIELD maxocc
```

```
        END IF

IF inp[cr].maxocc < inp[cr].minocc THEN
                CALL mess("Max occupancy must be greater or equal to min. occupan
                NEXT FIELD maxocc
        END IF ON KEY (F6)
        CASE
                WHEN INFIELD (ratecat)
                        CALL get_rate("rate_lu")
                                RETURNING inp[cr].ratecat, anyvalue
                        IF inp[cr].ratecat IS NOT NULL THEN
                                DISPLAY inp[cr].ratecat TO sc_monrt[sr].ratecat
                        END IF
        END CASE

END INPUT

IF int_flag = 0 THEN
        CALL indt()
ELSE
        CLOSE WINDOW rate_w
        LET int_flag = 0
        RETURN
END IF LET accnt = 0
IF int_flag = 0 THEN FOR x = 1 TO ac
        FOR y = 1 TO dac
                INSERT INTO rates
                VALUES (rate.ratetype, rate.propcd, dt[y].begdate,
                dt[y].enddate, inp[x].ratecat, inp[x].sgl, inp[x].dbl, inp[x].xp,
                inp[x].child, inp[x].taxyn, inp[x].commyn, inp[x].commamt,
                inp[x].minocc, inp[x].maxocc)
        END FOR LET accnt = accnt + 1
END FOR ELSE
        CALL mess("Interrupt entered, changes not recorded.")
END IF

END FUNCTION

FUNCTION indt()

DEFINE x                SMALLINT,
        cr, sr          SMALLINT

OPEN WINDOW indt_w AT 15,8 WITH FORM "ratedate" ATTRIBUTE (BORDER)

CLEAR FORM

INPUT ARRAY dt FROM sc_dater.*

BEFORE ROW, INSERT
        LET dac = ARR_COUNT()
        LET cr = ARR_CURR()
        LET sr = SCR_LINE()

AFTER ROW, DELETE
        LET dac = ARR_COUNT()
        LET cr = ARR_CURR()
        LET sr = SCR_LINE()

AFTER FIELD begdate
        IF dt[cr].begdate IS NULL THEN
                INITIALIZE dt[cr].* TO NULL
                DISPLAY dt[cr].* TO sc_dater[sr].*
                NEXT FIELD begdate
```

```
            ELSE
                    FOR x = 1 TO dac
                            IF x != cr AND dt[x].begdate <= dt[cr].begdate
                                    AND dt[cr].begdate <= dt[x].enddate THEN
                                CALL mess("Overlapping date range.")
                                INITIALIZE dt[cr].begdate TO NULL
                                DISPLAY dt[cr].begdate TO sc_dater[sr].begdate
                                NEXT FIELD begdate
                            END IF
                    END FOR
            END IF BEFORE FIELD enddate
        IF dt[cr].begdate < TODAY OR dt[cr].begdate IS NULL THEN
                CALL mess("Invalid date; Must be today of in the future.")
                NEXT FIELD begdate
        END IF AFTER FIELD enddate
        IF dt[cr].enddate < dt[cr].begdate  OR dt[cr].enddate IS NULL THEN
                CALL mess("Invalid date; Must be later than or equal to begin da
                NEXT FIELD enddate
        ELSE
                    FOR x = 1 TO dac
                            IF x != cr AND dt[x].begdate <= dt[cr].enddate
                                    AND dt[cr].enddate <= dt[x].enddate OR
                                    x != cr AND dt[x].begdate >= dt[cr].begdate
                                    AND dt[x].enddate <= dt[cr].enddate THEN
                                CALL mess("Overlapping date range.")
                                INITIALIZE dt[cr].enddate TO NULL
                                DISPLAY dt[cr].enddate TO sc_dater[sr].enddate
                                NEXT FIELD enddate

END IF
                    END FOR
            END IF

END INPUT

CLOSE WINDOW indt_w

END FUNCTION

{
: Module:      invlook.4gl
:
: Function:    prep_rate(), get_rate(tblname), val_rate(tblname, val)
:
: Purpose:     Load hotel specific static arrays into memory
:              and allow selection from windows and also validation.
:
: Author:      Kenneth J. Dowling
:
:              By       Date            Action
: Revisions:
:
: HYATT CONFIDENTIAL
: Copyright (C) 1989
:
}

DATABASE inv_sgl

DEFINE a2_ratecat ARRAY[100] OF RECORD
            a         CHAR(1),
            msgln     CHAR(4),
            msgdes    CHAR(30),
            b         CHAR(1)
            END RECORD,
        siz_ratecat   SMALLINT,
        a2_roomtype ARRAY[100] OF RECORD
            a         CHAR(1),
            msgln     CHAR(4),
            msgdes    CHAR(30),
            b         CHAR(1)
```

```
                END RECORD,
        siz_roomtype    SMALLINT

FUNCTION prep_rate(lupropcd)
        DEFINE  ar_row  SMALLINT,
                str     CHAR(100),
                lupropcd CHAR(5)

#spirit code array
        DECLARE s_ratecat CURSOR FOR
                SELECT ratecat, catdesc FROM rate_lu
                WHERE lupropcd = propcd
                ORDER BY ratecat LET ar_row = 1
        FOREACH s_ratecat INTO a2_ratecat[ar_row].msgln,
                               a2_ratecat[ar_row].msgdes
                INITIALIZE a2_ratecat[ar_row].a  TO NULL
                INITIALIZE a2_ratecat[ar_row].b  TO NULL
                LET ar_row = ar_row + 1
        END FOREACH
        LET siz_ratecat = ar_row -1 room type array
        DECLARE s_roomtype CURSOR FOR
                SELECT roomtype, typedesc FROM room
                WHERE lupropcd = propcd
                ORDER BY roomtype LET ar_row = 1
        FOREACH s_roomtype INTO a2_roomtype[ar_row].msgln,
                                a2_roomtype[ar_row].msgdes
                INITIALIZE a2_roomtype[ar_row].a  TO NULL
                INITIALIZE a2_roomtype[ar_row].b  TO NULL
                LET ar_row = ar_row + 1
        END FOREACH
        LET siz_roomtype = ar_row -1

END FUNCTION

# This function displays pop-up windows of valid descriptions
# when the F6 key is pressed.  The user can select a valid
# description and the function returns the coresponding
# valid code.
# NOTE:  a2_tblname contains descriptions;
a1_tblname contains values FUNCTION get_rate(tblname)

DEFINE  ret_val CHAR(15),
                ret_des CHAR(30),
                one_row SMALLINT,
                tblname CHAR(18),
                ar_row  SMALLINT,
                al,sl, max_sl SMALLINT   #array line/screen line/max screen line LET int_flag = 0
        LET max_sl = 15
        INITIALIZE ret_val TO NULL CASE (tblname)
        WHEN "rate_lu"
                LET ar_row = siz_ratecat
        WHEN "room"
                LET ar_row = siz_roomtype
        OTHERWISE
                CALL mess("Invalid table name for look up.")
END CASE IF ar_row = 0 THEN
        CALL mess("No rows on table")
ELSE
        LET int_flag = FALSE
        IF ar_row = 1 THEN
                LET one_row = TRUE
```

```
ELSE
        LET one_row = FALSE
END IF
IF one_row = FALSE THEN

CALL SET_COUNT(ar_row)
OPTIONS
        DELETE KEY F31,
        INSERT KEY F32
CASE tblname WHEN "rate_lu"
OPEN WINDOW catsrch AT 3,34 WITH FORM "get_ct" ATTRIBUTE(BORDER)
        LET al = ar_row + 1
        WHILE (ar_row + 1 = al)
        INPUT ARRAY a2_ratecat WITHOUT DEFAULTS FROM ct.*
                BEFORE ROW
                LET sl = SCR_LINE()
                LET al = ARR_CURR()
                IF al = ar_row + 1 THEN EXIT INPUT END IF
                DISPLAY a2_ratecat[al].* TO ct[sl].*
                        ATTRIBUTE (REVERSE)
                AFTER ROW
                LET sl = SCR_LINE()
                LET al = ARR_CURR()
                DISPLAY a2_ratecat[al].* TO ct[sl].*

END INPUT
            END WHILE

CLOSE WINDOW catsrch

WHEN "room"
OPEN WINDOW catsrch AT 3,34 WITH FORM "get_ct" ATTRIBUTE(BORDER)
        LET al = ar_row + 1
        WHILE (ar_row + 1 = al)
        INPUT ARRAY a2_roomtype WITHOUT DEFAULTS FROM ct.*
                BEFORE ROW
                LET sl = SCR_LINE()
                LET al = ARR_CURR()
                IF al = ar_row + 1 THEN EXIT INPUT END IF
                DISPLAY a2_roomtype[al].* TO ct[sl].*
                        ATTRIBUTE (REVERSE)
                    AFTER ROW
                    LET sl = SCR_LINE()
                    LET al = ARR_CURR()
                    DISPLAY a2_roomtype[al].* TO ct[sl].*

END INPUT
                END WHILE

CLOSE WINDOW catsrch

END CASE
                IF int_flag = FALSE AND ar_row > 1 THEN
                        LET ar_row = ARR_CURR()
                    END IF
ELSE
        LET ar_row = 1
END IF
        #reset the options
        CALL set_opts()

CASE tblname
        WHEN "rate_lu"          LET ret_val = a2_ratecat[ar_row].msgln
                                LET ret_des = a2_ratecat[ar_row].msgdes WHEN "room"             LET ret_val = a2_roomtype[ar_row].msgln
                                LET ret_des = a2_roomtype[ar_row].msgdes

END CASE
END IF

IF int_flag != 0 THEN
```

```
                INITIALIZE ret_val TO NULL
                INITIALIZE ret_des TO NULL
                LET int_flag = 0
        END IF RETURN ret_val, ret_des

END FUNCTION

# This function is used to verify that a value enterd by a user is
# valid.  The value the user entered (val) is compared to see if
# if is found in the array that contains the valid values.
# The values are loaded in the function prep_get_tbl().

FUNCTION val_rate(tblname, val)

DEFINE   tblname CHAR(18),
         val     CHAR(15),
         des     CHAR(30),
         i       SMALLINT LET des = NULL          #return null if not valid CASE tblname WHEN "rate_lu"          FOR i = 1 TO siz_ratecat
                                        IF val = a2_ratecat[i].msgln THEN
                                                LET des = a2_ratecat[i].msgdes
                                                EXIT FOR
                                        END IF
                                        END FOR WHEN "room"             FOR i = 1 TO siz_roomtype
                                        IF val = a2_roomtype[i].msgln THEN
                                                LET des = a2_roomtype[i].msgdes
                                                EXIT FOR
                                        END IF
                                        END FOR

END CASE

IF des IS NULL THEN
                INITIALIZE val TO NULL
        END IF

RETURN val, des

END FUNCTION

{
FUNCTION rate_eff(hotadd)

DEFINE hotadd RECORD
        propcd  LIKE hotel.propcd,
        stdt    DATE,
        enddt   DATE,
        ratecat LIKE rate_lu.ratecat
        END RECORD

# DECLARE s_curs CURSOR FOR
        SELECT ratecat FROM rates
                WHERE hotadd.propcd = propcd AND
                hotadd.stdt >= begdate AND
                hotadd.stdt <= enddate AND
                hotadd.enddt >= begdate AND
                hotadd.enddt <= enddate IF status = NOTFOUND THEN
        CALL mess("Dates not completely covered on rate table.")
END IF

END FUNCTION
}
```

```
{
: Module:     invmain.4gl
:
: Function:   main
:
: Purpose:    Open main menu system, set options and function keys
:
: Author:     Ken Dowling
:
:             By        Date           Action
: Revisions:
:
: HYATT CONFIDENTIAL
: Copyright (C) 1989
:
}
DATABASE inv_sgl

MAIN

DEFINE act CHAR(1)

DEFER INTERRUPT
DEFER QUIT

WHENEVER ERROR STOP
WHENEVER WARNING STOP

MESSAGE "Program load in progress. . ."

CALL prep_get_tbl()    # Loads hotel/spirit arrays

CALL set_opts()        # loads function key assignments

CALL setfkeys()        # displays and loads function key values

OPEN MAIN MENU

MENU "Inventory"

COMMAND "Check" "Check Room Availability"
                LET act = "S"
                CALL disarray(act)

COMMAND "Dates" "Add Inventory for Specified Dates"
                CALL datemenu()

COMMAND "Resv" "Show Inventory for Specified Dates"
                CALL resvinp()

COMMAND "Tables" "Maintain Inventory Support Tables"
                CALL tblmenu()

COMMAND "Output" "Print a hard copy of inventory matrix"
                LET act = "R"
                CALL disarray(act)

COMMAND KEY ("!")
                CALL bang()

COMMAND "Exit" "Exit from the Program"
                EXIT MENU

END MENU

CALL resetfkeys()

END MAIN

{
: Module:     invmnt.4gl
:
: Function:   rmmnt()
:
: Purpose:    Maintain lookup tables.
```

```
:               rmmnt() maintains rooms table.
:
: Author:       Ken Dowling
:
:               By        Date            Action
: Revisions:
:
: HYATT CONFIDENTIAL
: Copyright (C) 1989
:
}
DATABASE inv_sql FUNCTION rmmnt()

DEFINE rm ARRAY[40] OF RECORD
        roomtype        LIKE room.roomtype,
        typedesc        LIKE room.typedesc,
        rmcount         LIKE room.rmcount
        END RECORD, lupropcd        LIKE room.propcd,
        htlnm           LIKE hotel.htlnm,
        sl, ac, al      SMALLINT,       #screen line, array count, array line
        sa              SMALLINT,       # screen array
        x               SMALLINT        # counter OPEN WINDOW room_w AT 4,5 WITH FORM "rooms" ATTRIBUTE (BORDER)

LET int_flag = 0

INPUT lupropcd FROM formonly.propcd

AFTER FIELD propcd
                CALL val_tbl("hotel", lupropcd)
                        RETURNING lupropcd, htlnm
                IF lupropcd IS NULL THEN
                        CALL mess("Invalid property code")
                        NEXT FIELD formonly.propcd
                ELSE
                        DISPLAY BY NAME htlnm
                END IF

END INPUT

IF int_flag != 0 THEN
        LET int_flag = 0
        CLOSE WINDOW room_w
        RETURN
ELSE
        DECLARE rm_curs CURSOR FOR
                SELECT roomtype, typedesc, rmcount
                FROM room
                WHERE lupropcd = room.propcd
                ORDER BY roomtype LET ac = 0
        LET sa = 10

FOREACH rm_curs INTO rm[ac + 1].*

LET ac = ac + 1

IF ac <= sa THEN
                DISPLAY rm[ac].* to sc_rm[ac].*
        END IF

END FOREACH

CALL SET_COUNT(ac)

LET int_flag = 0

INPUT ARRAY rm WITHOUT DEFAULTS FROM sc_rm.*
```

```
BEFORE ROW
        LET ac = ARR_COUNT()
        LET al = ARR_CURR()
        LET sl = SCR_LINE()

AFTER ROW
        LET ac = ARR_COUNT()
        LET al = ARR_CURR()
        LET sl = SCR_LINE()

AFTER FIELD roomtype
        LET ac = ARR_COUNT()
        FOR x = 1 TO ac
                IF x != al AND rm[al].roomtype = rm[x].roomtype THEN
                        CALL mess("Duplicate room type.")
                        LET rm[al].roomtype = NULL
                        DISPLAY rm[al].* TO sc_rm[sl].*
                        NEXT FIELD roomtype
                END IF

END FOR

END INPUT

IF int_flag = 0 THEN
        DELETE FROM room
        WHERE lupropcd = propcd

FOR x = 1 TO ac
                IF rm[x].roomtype IS NOT NULL THEN
                        INSERT INTO room VALUES(lupropcd, rm[x].*)
                END IF
        END FOR
ELSE
        CALL mess("Interrupt entered - values not recorded.")
END IF CLOSE WINDOW room_w

END IF

END FUNCTION

FUNCTION spmnt()         #maintain Spirit List

DEFINE  ar      ARRAY[100] OF RECORD
                sprtcat  LIKE rate_lu.ratecat,
                catdesc  LIKE rate_lu.catdesc
        END RECORD,
        htlnm            LIKE hotel.htlnm,
        lupropcd         LIKE hotel.propcd,
        sl, ac, al SMALLINT,           #screen line, array count, array line
        sa      SMALLINT,              #screen array
        x       SMALLINT               #counters OPEN WINDOW rate_w AT 4,2 WITH FORM "rate_w"
        ATTRIBUTE (BORDER)

LET int_flag = 0

INPUT lupropcd FROM formonly.propcd
        AFTER FIELD propcd
                CALL val_tbl("hotel", lupropcd)
                        RETURNING lupropcd, htlnm
                IF lupropcd IS NULL THEN
                        CALL mess("Invalid property code")
                        NEXT FIELD formonly.propcd
                ELSE
                        DISPLAY BY NAME htlnm
```

```
                END IF

END INPUT

IF int_flag != 0 THEN
        LET int_flag = 0
        CLOSE WINDOW rate_w
        RETURN
END IF DECLARE x CURSOR FOR
        SELECT ratecat, catdesc
        FROM rate_lu
        WHERE propcd = lupropcd
        ORDER BY ratecat LET ac = 0
LET sa = 10

FOREACH x INTO ar[ac + 1].*

LET ac = ac + 1

IF ac <= sa THEN
        DISPLAY ar[ac].* TO sr[ac].*
END IF

END FOREACH

CALL SET_COUNT(ac)

LET int_flag = 0

INPUT ARRAY ar WITHOUT DEFAULTS FROM sr.*

BEFORE ROW
                LET ac = ARR_COUNT()
                LET al = ARR_CURR()
                LET sl = SCR_LINE()

AFTER ROW
                LET ac = ARR_COUNT()
                LET al = ARR_CURR()
                LET sl = SCR_LINE()

AFTER FIELD ratecat
                LET ac = ARR_COUNT()
                FOR x = 1 TO ac
                        IF x != al AND ar[al].sprtcat = ar[x].sprtcat THEN
                                CALL mess("duplicate row")
                                LET ar[al].sprtcat = NULL
                                DISPLAY ar[al].* TO sr[sl].*
                                NEXT FIELD ratecat
                        END IF
                END FOR

END INPUT

IF int_flag = 0 THEN
BEGIN WORK
        DELETE FROM rate_lu
        WHERE propcd = lupropcd
        FOR x = 1 TO ac
                IF ar[x].sprtcat IS NOT NULL THEN
                        INSERT INTO rate_lu VALUES(lupropcd, ar[x].*)
                END IF
        END FOR
COMMIT WORK
ELSE
        CALL mess("Interrupt entered - values not recorded.")
END IF CLOSE WINDOW rate_w
```

```
END FUNCTION

FUNCTION htlmnt()                         #maintain Hotel code listing

DEFINE   ar        ARRAY[200] OF RECORD
         propcd             LIKE hotel.propcd,
         htlnm              LIKE hotel.htlnm
         END RECORD,
         sl, ac, al  SMALLINT,            #screen line, array count, array line
         sa         SMALLINT,             #screen array
         x          SMALLINT              #counters OPEN WINDOW hotel_w AT 4,2 WITH FORM "hotel"
         ATTRIBUTE (BORDER)

DECLARE w CURSOR FOR
         SELECT * FROM hotel
         ORDER BY propcd

LET ac = 0
LET sa = 15

FOREACH w INTO ar[ac + 1].*

LET ac = ac + 1

IF ac <= sa THEN
         DISPLAY ar[ac].* TO scr[ac].*
END IF

END FOREACH

CALL SET_COUNT(ac)

LET int_flag = 0

INPUT ARRAY ar WITHOUT DEFAULTS FROM scr.*

BEFORE ROW
                 LET ac = ARR_COUNT()
                 LET al = ARR_CURR()
                 LET sl = SCR_LINE()

AFTER ROW
                 LET ac = ARR_COUNT()
                 LET al = ARR_CURR()
                 LET sl = SCR_LINE()

AFTER FIELD propcd
                 LET ac = ARR_COUNT()
                 FOR x = 1 TO ac
                         IF x != al AND ar[al].propcd = ar[x].propcd THEN
                                 CALL mess("duplicate row")
                                 LET ar[al].propcd = NULL
                                 DISPLAY ar[al].* TO scr[sl].*
                                 NEXT FIELD propcd
                         END IF
                 END FOR

END INPUT

IF int_flag = 0 THEN
BEGIN WORK
         DELETE FROM hotel
         FOR x = 1 TO ac
                 IF ar[x].propcd IS NOT NULL THEN
                         INSERT INTO hotel VALUES(ar[x].*)
                 END IF
         END FOR
COMMIT WORK
         MESSAGE "Loading static arrays. . ."
         CALL prep_get_tbl()
ELSE
         CALL mess("Interrupt entered - values not recorded.")
```

```
  END IF

CLOSE WINDOW hotel_w

END FUNCTION

{
: Module:       lookup.4gl
:
: Function:     prep_get_tbl(), get_tbl(tblname), val_tbl(tblname, val)
:
: Purpose:      Load static arrays into memory and allow selection
:               from windows and also validation.
:
: Author:       Kenneth J. Dowling
:
:               By        Date            Action
: Revisions:
:
: HYATT CONFIDENTIAL
: Copyright (C) 1989
:
}

DATABASE inv_sql

DEFINE a2_hotel ARRAY[200] OF RECORD
            a       CHAR(1),
            msgln   CHAR(5),
            msgdes  CHAR(30),
            b       CHAR(1)
            END RECORD,
       siz_hotel    SMALLINT,
       a2_typerate ARRAY[10] OF RECORD
            a       CHAR(1),
            msgln   CHAR(4),
            msgdes  CHAR(30),
            b       CHAR(1)
            END RECORD,
       siz_typerate SMALLINT FUNCTION prep_get_tbl()
       DEFINE  ar_row   SMALLINT,
               str      CHAR(100)

#hotel array
       DECLARE s_hotel CURSOR FOR
               SELECT propcd, htlnm FROM hotel
               ORDER BY propcd LET ar_row = 1
       FOREACH s_hotel INTO a2_hotel[ar_row].msgln, a2_hotel[ar_row].msgdes
               INITIALIZE a2_hotel[ar_row].a  TO NULL
               INITIALIZE a2_hotel[ar_row].b  TO NULL
               LET ar_row = ar_row + 1
       END FOREACH LET siz_hotel = ar_row -1 typerate array
       DECLARE s_typerate CURSOR FOR
               SELECT ratetype, rttypedes FROM typerate
               ORDER BY ratetype LET ar_row = 1
       FOREACH s_typerate INTO a2_typerate[ar_row].msgln,
                               a2_typerate[ar_row].msgdes
               INITIALIZE a2_typerate[ar_row].a  TO NULL
               INITIALIZE a2_typerate[ar_row].b  TO NULL
               LET ar_row = ar_row + 1
       END FOREACH
       LET siz_typerate = ar_row -1

END FUNCTION
```

```
# This function displays pop-up windows of valid descriptions
# when the F6 key is pressed. The user can select a valid
# description and the function returns the coresponding
# valid code.
# NOTE:   a2_tblname contains descriptions;
a1_tblname contains values FUNCTION get_tbl(tblname)

DEFINE   ret_val CHAR(15),
                 ret_des CHAR(30),
                 one_row SMALLINT,
                 tblname CHAR(18),
                 ar_row  SMALLINT,
                 al,sl, max_sl SMALLINT    #array line/screen line/max screen line LET int_flag = 0
        LET max_sl = 15
        LET ret_val = NULL CASE tblname
                WHEN "hotel"             LET ar_row = siz_hotel
                WHEN "typerate"          LET ar_row = siz_typerate
        END CASE IF ar_row = 0 THEN
                ERROR "No rows on table"
                SLEEP 3
        ELSE
                LET int_flag = FALSE
                IF ar_row = 1 THEN
                        LET one_row = TRUE ELSE .
                LET one_row = FALSE
        END IF
        IF one_row = FALSE THEN CALL SET_COUNT(ar_row)
        OPTIONS
                DELETE KEY F31,
                INSERT KEY F32

CASE tblname
        WHEN "hotel"
        OPEN WINDOW xsrch_w AT 3,35 WITH FORM "get_prop" ATTRIBUTE(BORDE:
                LET al = ar_row + 1
                WHILE (ar_row + 1 = al)
                INPUT ARRAY a2_hotel WITHOUT DEFAULTS FROM pt.*
                        BEFORE ROW
                        LET sl = SCR_LINE()
                        LET al = ARR_CURR()
                        IF al = ar_row + 1 THEN EXIT INPUT END IF
                        DISPLAY a2_hotel[al].* TO pt[sl].*
                                ATTRIBUTE (REVERSE)
                        AFTER ROW
                        LET sl = SCR_LINE()
                        LET al = ARR_CURR()
                        DISPLAY a2_hotel[al].* TO pt[sl].*

END INPUT
                END WHILE
        CLOSE WINDOW xsrch_w

WHEN "typerate"
        OPEN WINDOW catsrch AT 3,34 WITH FORM "get_ct" ATTRIBUTE(BORDER)
                LET al = ar_row + 1
                WHILE (ar_row + 1 = al)
                INPUT ARRAY a2_typerate WITHOUT DEFAULTS FROM ct.*
                        BEFORE ROW
                        LET sl = SCR_LINE()
                        LET al = ARR_CURR()
                        IF al = ar_row + 1 THEN EXIT INPUT END IF
                        DISPLAY a2_typerate[al].* TO ct[sl].*
                                ATTRIBUTE (REVERSE)
```

```
                    AFTER ROW
                        LET sl = SCR_LINE()
                        LET al = ARR_CURR()
                        DISPLAY a2_typerate[al].* TO ct[sl].*

END INPUT
                END WHILE
            CLOSE WINDOW catsrch

END CASE
                    IF int_flag = FALSE AND ar_row > 1 THEN
                            LET ar_row = ARR_CURR()
                    END IF
    ELSE
            LET ar_row = 1
    END IF
            #reset the options
            CALL set_opts()

CASE tblname
            WHEN "hotel"            LET ret_val = a2_hotel[ar_row].msgln
                                    LET ret_des = a2_hotel[ar_row].msgdes
            WHEN "typerate"         LET ret_val = a2_typerate[ar_row].msgln
                                    LET ret_des = a2_typerate[ar_row].msgdes

END CASE
    END IF

IF int_flag != 0 THEN
            INITIALIZE ret_val TO NULL
            INITIALIZE ret_des TO NULL
            LET int_flag = 0
    END IF RETURN ret_val, ret_des

END FUNCTION

# This function is used to verify that a value enterd by a user is
# valid.  The value the user entered (val) is compared to see if
# if is found in the array that contains the valid values.
# The values are loaded in the function prep_get_tbl().

FUNCTION val_tbl(tblname, val)

DEFINE  tblname CHAR(18),
        val     CHAR(15),
        des     CHAR(30),
        i       SMALLINT LET des = NULL          #return null if not valid CASE tblname
                WHEN "hotel"            FOR i = 1 TO siz_hotel
                                        IF val = a2_hotel[i].msgln THEN
                                                LET des = a2_hotel[i].msgdes
                                                EXIT FOR
                                        END IF
                                        END FOR WHEN "typerate"         FOR i = 1 TO siz_typerate
                                        IF val = a2_typerate[i].msgln THEN
                                                LET des = a2_typerate[i].msgdes
                                                EXIT FOR
                                        END IF
                                        END FOR
        END CASE IF des IS NULL THEN
                INITIALIZE val TO NULL
        END IF RETURN val, des

END FUNCTION
```

```
{
: Module:     mess.4gl
:
: Function:   mess(str)
:
: Purpose:    Process error messages.  Opens a window in lower right
:             corner of the screen with message.
:
: Author:     Ronald Roades
:
:             By          Date            Action
: Revisions:
:
: HYATT CONFIDENTIAL
: Copyright (C) 1989
:
}

FUNCTION mess(str)

DEFINE  str     CHAR(65),
                answer  CHAR(1),
                y,x     SMALLINT LET str = str CLIPPED, " <CR> "
        LET y = LENGTH(str) + 1
        LET x = 78 - LENGTH(str)
        OPEN WINDOW mess_w AT 23,x WITH 1 ROWS, y COLUMNS
                ATTRIBUTE(BORDER, REVERSE)

PROMPT str CLIPPED FOR CHAR answer
        LET INT_FLAG = 0

CLOSE WINDOW mess_w

END FUNCTION

{
: Module:
:
: Function:
:
: Purpose:
:
:
: Author:     Ken Dowling
:
:             By          Date            Action
: Revisions:
:
: HYATT CONFIDENTIAL
: Copyright (C) 1989
:
}
DATABASE inv_sgl GLOBALS
        "glob.4gl"

#  THIS FUNCTION DETERMINES THE LARGER OF TWO VALUES

FUNCTION mmax(a,b)

DEFINE a,b      INTEGER

IF a <= b THEN
        RETURN b
ELSE
        RETURN a
END IF

END FUNCTION
```

```

#  THIS FUNCTION DETERMINES THE LARGER OF TWO VALUES

FUNCTION mmin(a,b)

DEFINE a,b      INTEGER

IF a <= b THEN
        RETURN a
ELSE

RETURN b
END IF

END FUNCTION

FUNCTION mmdata(mmd)

DEFINE mmd RECORD
        propcd          LIKE hotel.propcd,
        stdt            LIKE inven.invdate,
        enddt           LIKE inven.invdate
        END RECORD,
        s_big RECORD
        propcd          LIKE hotel.propcd,
        mindate         DATE,
        maxdate         DATE
        END RECORD IF cmm = "Y" THEN
        SELECT * INTO s_big.*
        FROM t_big
        WHERE mmd.propcd = t_big.propcd IF status = NOTFOUND THEN
        INSERT INTO t_big
                VALUES(mmd.propcd, mmd.stdt, mmd.enddt)
ELSE
        CALL mmin(mmd.stdt, s_big.mindate)
                RETURNING s_big.mindate
        CALL mmax(mmd.enddt, s_big.maxdate)
                RETURNING s_big.maxdate UPDATE t_big
                SET (propcd, mindate, maxdate)
                        = (s_big.propcd, s_big.mindate, s_big.maxdate)
                WHERE t_big.propcd = s_big.propcd

END IF

ELSE
        CREATE TEMP TABLE t_big
                (propcd         CHAR(5),
                mindate         DATE,
                maxdate         DATE)

INSERT INTO t_big
                VALUES(mmd.propcd, mmd.stdt, mmd.enddt)

LET cmm = "Y"
END IF

END FUNCTION

{
: Module:       modrate.4gl
:
: Function:     modrates()
:
: Purpose:      Modify rates and valid dates for a specified hotel.
:
:
: Author:       Ken Dowling
```

```
:                   By          Date            Action
: Revisions:
:
: HYATT CONFIDENTIAL
: Copyright (C) 1989
:
}
DATABASE inv_sql FUNCTION modrates()

DEFINE   rate RECORD
         ratetype        LIKE typerate.ratetype,
         propcd          LIKE hotel.propcd
         END RECORD, htlnm           LIKE hotel.htlnm,
         rttypedes       LIKE typerate.rttypedes OPEN WINDOW rate_w AT 4, 3 WITH FORM "monrate" ATTRIBUTE (BORDER)

WHILE (1)

LET int_flag = 0

CLEAR FORM

INPUT BY NAME rate.ratetype, rate.propcd

AFTER FIELD ratetype
        CALL val_tbl("typerate", rate.ratetype)
                RETURNING rate.ratetype, rttypedes
        IF rate.ratetype IS NULL THEN
                CALL mess("Invalid rate type.")
                NEXT FIELD ratetype
        ELSE
                DISPLAY BY NAME rttypedes
        END IF AFTER FIELD propcd
        CALL val_tbl("hotel", rate.propcd)
                RETURNING rate.propcd, htlnm
        IF rate.propcd IS NULL THEN
                CALL mess("Invalid property code.")
                NEXT FIELD propcd
        ELSE
                DISPLAY BY NAME htlnm
        END IF

ON KEY (F6)
        CASE

WHEN INFIELD (ratetype)
                        CALL get_tbl("typerate")
                                RETURNING rate.ratetype, rttypedes
                        IF rate.ratetype IS NOT NULL THEN
                                DISPLAY BY NAME rate.ratetype, rttypedes
                                NEXT FIELD propcd
                        ELSE
                                NEXT FIELD ratetype
                        END IF WHEN INFIELD (propcd)
                        CALL get_tbl("hotel")
                                RETURNING rate.propcd, htlnm
                        IF rate.propcd IS NOT NULL THEN
                                DISPLAY BY NAME rate.propcd, htlnm
                        ELSE
                                NEXT FIELD propcd
                        END IF

END CASE

END INPUT
```

```
    IF int_flag != 0 THEN
            EXIT WHILE
    END IF

CALL inrate(rate.*)

END WHILE

CLOSE WINDOW rate_w

END FUNCTION

{
: Module:        parain.4gl
:
: Function:      parainp()
:
: Purpose:       For input of hotel, date, roomtype info
:
:
: Author:        Ken Dowling
:
:                By         Date             Action
: Revisions:
:
: HYATT CONFIDENTIAL
: Copyright (C) 1989
:
}
DATABASE inv_sql FUNCTION parainp()

DEFINE paradd RECORD
        propcd  LIKE hotel.propcd,
        stdt    date,
        enddt   date,
        ratecat LIKE rate_lu.ratecat
      END RECORD,
        htlnm   LIKE hotel.htlnm,
        catdesc LIKE rate_lu.catdesc LET int_flag = 0

CLEAR FORM

INPUT BY NAME paradd.propcd, paradd.stdt, paradd.enddt, paradd.ratecat

AFTER FIELD propcd
        CALL val_tbl("hotel", paradd.propcd)
               RETURNING paradd.propcd, htlnm IF paradd.propcd IS NULL THEN
                CALL mess("Invalid Property Code.")
                NEXT FIELD propcd
        ELSE
                DISPLAY BY NAME htlnm
        END IF BEFORE FIELD stdt
        CALL prep_rate(paradd.propcd)

AFTER FIELD stdt
        IF paradd.stdt < TODAY OR paradd.stdt IS NULL THEN
                CALL mess("Invalid Date; Must be today or in the future.")
                NEXT FIELD stdt
        END IF AFTER FIELD enddt
        IF paradd.enddt < paradd.stdt THEN
                CALL mess("Invalid Date, Must be greater than or equal to start d
                NEXT FIELD enddt
        ELSE
```

```
                    IF paradd.enddt IS NULL THEN
                            LET paradd.enddt= paradd.stdt
                            DISPLAY paradd.enddt TO enddt
                    END IF
            END IF AFTER FIELD ratecat
            IF paradd.ratecat IS NOT NULL THEN
                    CALL val_rate("rate_lu", paradd.ratecat)
                            RETURNING paradd.ratecat, catdesc
                    IF paradd.ratecat IS NULL THEN
                            CALL mess("Invalid Rate Category.")
                            NEXT FIELD ratecat
                    ELSE
                            DISPLAY BY NAME catdesc
                    END IF
            END IF ON KEY (F6)
            CASE
                    WHEN INFIELD (propcd)
                            CALL get_tbl("hotel")
                                    RETURNING paradd.propcd, htlnm
                            IF paradd.propcd IS NOT NULL THEN
                                    DISPLAY BY NAME paradd.propcd, htlnm
                                    NEXT FIELD stdt
                            END IF WHEN INFIELD (ratecat)
                            CALL get_rate("rate_lu")
                                    RETURNING paradd.ratecat, catdesc
                            IF paradd.ratecat IS NOT NULL THEN
                                    DISPLAY BY NAME paradd.ratecat, catdesc
                            END IF
            END CASE AFTER INPUT
                IF int_flag = 0 THEN CASE
                            WHEN paradd.propcd IS NULL
                                    CALL mess("Value required.")
                                    NEXT FIELD propcd
                            WHEN paradd.stdt IS NULL
                                    CALL mess("Value required.")
                                    NEXT FIELD stdt
                            WHEN paradd.enddt IS NULL
                                    CALL mess("Value required.")
                                    NEXT FIELD enddt
                            WHEN paradd.ratecat IS NULL
                                    CALL mess("Value required.")
                                    NEXT FIELD ratecat
                    END CASE
                END IF

END INPUT

IF int_flag = 0 THEN
        RETURN paradd.*
ELSE
        INITIALIZE paradd.* TO NULL
        RETURN paradd.*
END IF

END FUNCTION

{
: Module:       resvinp.4gl
:
: Function:     resvinp()
:
: Purpose:      Allow for input of minimal information to make a reservation
:               and then call functions for the rest of the checks.
:
: Author:       Ken Dowling
```

```
:                    By         Date              Action
: Revisions:
:
: HYATT CONFIDENTIAL
: Copyright (C) 1989
:
}
DATABASE inv_sgl GLOBALS
        "glob.4gl"

FUNCTION resvinp()

DEFINE act       CHAR(1)

OPEN WINDOW resv_w AT 4,8 WITH FORM "resv" ATTRIBUTE (BORDER)

MENU "Resv"
        COMMAND "Sell" "Execute a sell"
                LET act = "S"
                CLEAR FORM
                CALL inp(act)

COMMAND "Cancel" "Cancel a reservation."
                LET act = "C"
                CLEAR FORM
                CALL inp(act)

COMMAND "Exit" "Return to main menu"
                EXIT MENU

END MENU

CLOSE WINDOW resv_w

END FUNCTION

FUNCTION inp(act)
DEFINE   htlnm           LIKE hotel.htlnm,
         catdesc         LIKE rate_lu.catdesc,
         typedesc        LIKE room.typedesc,
         act             CHAR(1)

LET int_flag = 0

INPUT BY NAME sel.propcd, sel.stdt, sel.enddt, sel.numrm,
              sel.ratecat, sel.roomtype, sel.force AFTER FIELD propcd
        IF sel.propcd IS NOT NULL THEN
                CALL val_tbl("hotel", sel.propcd)
                        RETURNING sel.propcd, htlnm IF sel.propcd IS NULL THEN
                        CALL mess("Invalid Property Code.")
                        NEXT FIELD propcd
                ELSE
                        DISPLAY BY NAME htlnm
                END IF
        END IF BEFORE FIELD stdt
        CALL prep_rate(sel.propcd)

AFTER FIELD stdt
        IF sel.stdt < TODAY OR sel.stdt IS NULL THEN
                CALL mess("Invalid Date; Must be today or in the future.")
                NEXT FIELD stdt
        END IF AFTER FIELD enddt
        IF sel.enddt <= sel.stdt THEN
```

```
                    CALL mess("Invalid Date, Must be greater than to arrival date.")
                    NEXT FIELD enddt
        ELSE
                IF sel.enddt IS NULL THEN
                        LET sel.enddt = sel.stdt + 1
                        DISPLAY sel.enddt TO enddt
                END IF
        END IF AFTER FIELD ratecat
        IF sel.ratecat IS NOT NULL THEN
                CALL val_rate("rate_lu", sel.ratecat)
                        RETURNING sel.ratecat, catdesc
                IF sel.ratecat IS NULL THEN
                        CALL mess("Invalid Rate Category.")
```

Nov 9 17:21 1989 resvinp.4gl Page 3

```
                                        NEXT FIELD ratecat
                        ELSE
                                DISPLAY BY NAME catdesc
                        END IF
                END IF AFTER FIELD roomtype
                IF sel.roomtype IS NOT NULL THEN
                        CALL val_rate("room", sel.roomtype)
                                RETURNING sel.roomtype, typedesc
                        IF sel.roomtype IS NULL THEN
                                CALL mess("Invalid Roomtype.")
                                NEXT FIELD roomtype
                        ELSE
                                DISPLAY BY NAME typedesc
                        END IF
                END IF ON KEY (F6)
                CASE
                        WHEN INFIELD (propcd)
                                CALL get_tbl("hotel")
                                        RETURNING sel.propcd, htlnm
                                IF sel.propcd IS NOT NULL THEN
                                        DISPLAY BY NAME sel.propcd, htlnm
                                        NEXT FIELD stdt
                                END IF WHEN INFIELD (ratecat)
                                CALL get_rate("rate_lu")
                                        RETURNING sel.ratecat, catdesc
                                IF sel.ratecat IS NOT NULL THEN
                                        DISPLAY BY NAME sel.ratecat, catdesc
                                END IF WHEN INFIELD (roomtype)
                                CALL get_rate("room")
                                        RETURNING sel.roomtype, typedesc
                                IF sel.roomtype IS NOT NULL THEN
                                        DISPLAY BY NAME sel.roomtype, typedesc
                                END IF
                END CASE
        END INPUT IF int_flag = 0 THEN
                CASE act
                        WHEN "S"
                                CALL sell()
                        WHEN "C"
                                CALL cancel()
```

Nov 9 17:21 1989 resvinp.4gl Page 4

```
                        OTHERWISE
                                CALL mess("Invalid action code. . . ")
```

```
                    END CASE
        ELSE
                LET int_flag = 0
                CALL mess("Interrupt entered; data discarded.")
        END IF END FUNCTION
Nov  9 17:21 1989   rm_blck.4gl Page 1

{
: Module:       rm_blck.4gl
:
: Function:     room_blck(siz_sel)
:
: Purpose:      Check for enough blocked inventory
:               for the specific roomtype.
:
: Author:       Ken Dowling
:
:               By          Date            Action
: Revisions:
:
: HYATT CONFIDENTIAL
: Copyright (C) 1989
:
}
DATABASE inv_sgl GLOBALS
      "glob.4gl"

FUNCTION room_blck(siz_sel)

DEFINE    siz_sel    SMALLINT,
          i          SMALLINT,
          x          SMALLINT,    # COUNTER NUMBER OF ROWS (4 ROWS PER DAY)
          y          SMALLINT,    # COUNTER REPRESENTING DAYS
          cont       SMALLINT,    # 0 IF OK TO CONTINUE
          blk_sel    ARRAY[7] OF RECORD
             aoj     SMALLINT,
             rboj    SMALLINT,
             dt      DATE
          END RECORD INITIALIZE blk_sel[1].* TO NULL
FOR i = 2 TO 7
   LET blk_sel[i].* = blk_sel[1].*
END FOR LET y = 1

CHECK FOR UNBLOCKED INVENTORY AVAILABLE FOR ROOM
# Aoj - RBoj >= r
FOR x = 1 TO siz_sel
    # INCREMENT DAY COUNTER
    IF ( x != 1 ) THEN
       IF ( rminfo[x].invdate != rminfo[x-1].invdate ) THEN
          LET y = y + 1
       END IF
Nov  9 17:21 1989   rm_blck.4gl Page 2

END IF

IF ( rminfo[x].ratecat NOT MATCHES "*MAX" ) AND
       ( rminfo[x].roomtype MATCHES "*MAX" ) THEN
          IF rminfo[x].avail - rminfo[x].remblock < sel.numrm THEN
             # STORE Aoj AND RBoj AND DATE
             LET blk_sel[y].aoj = rminfo[x].avail
             LET blk_sel[y].rboj = rminfo[x].remblock
             LET blk_sel[y].dt = rminfo[x].invdate
             LET cont = 50
             CALL mess("Check for unblocked inven failed.")
```

```
                END IF
         END IF
END FOR

# IF NOT AVAILABLE
# CHECK FOR BLOCKED INVENTORY AVAILABLE FOR RATE
# RBij >= r - ( Aoj - RBoj )
LET y = 1
LET x = 1
IF cont = 50 THEN
    IF ( x != 1 ) THEN
        IF ( rminfo[x].invdate != rminfo[x-1].invdate ) THEN
            LET y = y + 1
        END IF
    END IF FOR x = 1 TO siz_sel
        IF ( rminfo[x].ratecat   NOT MATCHES "*MAX" ) AND
           ( rminfo[x].roomtype NOT MATCHES "*MAX" ) AND
           ( rminfo[x].invdate = blk_sel[y].dt ) AND
           ( blk_sel[y].dt IS NOT NULL ) THEN
               IF ( rminfo[x].remblock >= sel.numrm -
                    ( blk_sel[y].aoj - blk_sel[y].rboj ) ) THEN
                   LET cont = 0
                   LET y = y + 1
               ELSE
                   # NOT AVAILABLE DON'T SELL ROOM
                   LET cont = 100
                   CALL mess("Check for block inven failed.")
                   EXIT FOR
               END IF
        END IF
    END FOR
END IF RETURN cont

END FUNCTION
```

Nov  9 17:21 1989  rmmax.4gl Page 1

```
{
: Module:      rmmax.4gl
:
: Function:    rmmax()
:
: Purpose:     Add rooms limits, maximum for day and for specific
:              room types.
:
: Author:      Ken Dowling
:
:              By        Date         Action
: Revisions:
:
: HYATT CONFIDENTIAL
: Copyright (C) 1989
:
}
DATABASE inv_sgl GLOBALS
        "glob.4gl"

DEFINE rmadd RECORD
        propcd           LIKE hotel.propcd,
        stdt             DATE,
        enddt            DATE,
        rmauth           LIKE room.rmcount
       END RECORD,
        ar_row, x        SMALLINT,
        dt               INTEGER,
        sr, ac           SMALLINT,
        siz_rm           SMALLINT,
        sel              CHAR(200),       —
```

```
            rm  ARRAY[15]    OF CHAR(4),
            rmallow ARRAY[15] OF SMALLINT,
            rmupd RECORD
              rowid           INTEGER,
              propcd          LIKE inven.propcd,
              invdate         LIKE inven.invdate,
              ratecat         LIKE inven.ratecat,
              roomtype        LIKE inven.roomtype,
              auth            LIKE inven.auth,
              avail           LIKE inven.avail,
              block           LIKE inven.block,
              remblock        LIKE inven.remblock,
              sold            LIKE inven.sold
            END RECORD FUNCTION rmmax()
Nov 9 17:21 1989  rmmax.4gl Page 2

DEFINE    htlnm           LIKE hotel.htlnm

OPEN WINDOW w_rmax AT 4,3 WITH FORM "rmmax" ATTRIBUTE (BORDER)

LET int_flag = 0

CLEAR FORM

INPUT BY NAME rmadd.propcd, rmadd.stdt,rmadd.enddt,rmadd.rmauth

AFTER FIELD propcd
        CALL val_tbl("hotel", rmadd.propcd)
              RETURNING rmadd.propcd, htlnm IF rmadd.propcd IS NULL THEN
              CALL mess("Invalid Property Code.")
              NEXT FIELD propcd
        ELSE
              DISPLAY BY NAME htlnm
        END IF AFTER FIELD stdt
        IF rmadd.stdt < TODAY OR rmadd.stdt IS NULL THEN
              CALL mess("Invalid Date; Must be today or in the future.")
              NEXT FIELD stdt
        END IF AFTER FIELD enddt
        IF rmadd.enddt < rmadd.stdt THEN
              CALL mess("Invalid Date, Must be greater than or equal to start
              NEXT FIELD enddt
        ELSE
              IF rmadd.enddt IS NULL THEN
                    LET rmadd.enddt = rmadd.stdt
                    DISPLAY rmadd.enddt TO enddt
              END IF
        END IF AFTER FIELD rmauth
        IF rmadd.rmauth < 0 THEN
              CALL mess("Number of authorized rooms must be >= 0.")
              INITIALIZE rmadd.rmauth TO NULL
              DISPLAY BY NAME rmadd.rmauth
              NEXT FIELD rmauth
        END IF ON KEY (F6)
        CASE
              WHEN INFIELD (propcd)
                    CALL get_tbl("hotel")
```

Nov  9 17:21 1989   rmmax.4gl Page 3

```
                                  RETURNING rmadd.propcd, htlnm
                         IF rmadd.propcd IS NOT NULL THEN
                                  DISPLAY BY NAME rmadd.propcd, htlnm
                                  NEXT FIELD stdt
                         END IF
          END CASE AFTER INPUT
          IF int_flag = 0 THEN
                    CASE
                         WHEN rmadd.propcd IS NULL
                              CALL mess("Value required.")
                              NEXT FIELD propcd
                         WHEN rmadd.stdt IS NULL
                              CALL mess("Value required.")
                              NEXT FIELD stdt
                         WHEN rmadd.enddt IS NULL
                              CALL mess("Value required.")
                              NEXT FIELD enddt
                         WHEN rmadd.rmauth IS NULL
                              CALL mess("Value required.")
                              NEXT FIELD rmauth
                    END CASE
          END IF

END INPUT

IF int_flag = 0 THEN
          CALL rmmenu()
ELSE
          LET int_flag = 0
END IF CLOSE WINDOW w_rmax

END FUNCTION

FUNCTION rmmenu()

FOR x = 1 TO 14
          LET rmallow[x] = 0
END FOR

OPEN WINDOW rminp_w AT 13,3 WITH FORM "rminp" ATTRIBUTE (BORDER)

MENU "Rooms"
          COMMAND "Room limits" "Add new room limits for specified date range"
                    CALL rminp()
          COMMAND "Save and exit" "Record data and exit"
```

Nov  9 17:21 1989   rmmax.4gl Page 4

```
                    CALL savrm()
                    EXIT MENU
          COMMAND "Discard and exit" "Exit without saving changes"
                    CALL mess("Data discarded.")
                    EXIT MENU
END MENU CLOSE WINDOW rminp_w

END FUNCTION

FUNCTION rminp()

DEFINE    summax              SMALLINT

#   INITIALIZE ARRAY 0

```

```
DECLARE rm_curs CURSOR FOR
        SELECT roomtype
        FROM room
        WHERE rmadd.propcd = room.propcd
        ORDER BY roomtype LET ar_row = 1

FOREACH rm_curs INTO rm[ar_row]
        LET ar_row = ar_row + 1
END FOREACH

LET siz_rm = ar_row - 1

# CLEAN UP THIS LOGIC? ?!? ?!?!?!?!?!??!? ?!? !? !?
IF siz_rm = 0 THEN
        CALL mess("No valid room types set up for this hotel.")
        RETURN
ELSE
        FOR x = 1 TO siz_rm
                DISPLAY rm[x] TO sc_rmty[x].roomtype
        END FOR
END IF LET summax = 0

INPUT ARRAY rmallow WITHOUT DEFAULTS FROM sc_max.*

AFTER FIELD rmmax
                LET sr = SCR_LINE()
                LET ac = ARR_CURR()
Nov  9 17:21 1989   rmmax.4gl Page 5

LET summax = summax + rmallow[ac]

# FIGURE THIS OUT ?!?!?!?!?!?!?
                IF ac = siz_rm THEN
                        EXIT INPUT
                ELSE
                        IF rmallow[ac] > rmadd.rmauth THEN
                                CALL mess("Maximum rooms must be <= to authorized
                                LET rmallow[ac] = 0
                                DISPLAY rmallow[ac] TO sc_max[sr].*
                                NEXT FIELD rmmax
                        END IF
                END IF

END INPUT

IF summax < rmadd.rmauth THEN
                CALL mess("Rooms authorised greater than sum of individual room a
        END IF

END FUNCTION

FUNCTION savrm()

LET sel = "SELECT rowid, *",
        " FROM inven",
        " WHERE inven.propcd = \"",rmadd.propcd CLIPPED,"\"",
        " AND inven.invdate = ?",
        " AND inven.roomtype = ?",
        " AND inven.ratecat = \"*MAX\""

PREPARE sel_1 FROM sel

LET siz_rm = siz_rm + 1
LET rm[siz_rm] = "*MAX"
LET rmallow[siz_rm] = rmadd.rmauth FOR dt = rmadd.stdt TO rmadd.enddt
        FOR x = 1 TO siz_rm
```

```
        OPEN sel_1 USING dt, rm[x]

FETCH sel_1 INTO rmupd.*

IF status = NOTFOUND THEN
                INSERT INTO inven (propcd, invdate, ratecat, roomtype, auth,
                                avail, block, remblock, sold)
                    VALUES (rmadd.propcd, dt, "*MAX", rm[x], rmallow[x], rmallow[x],

#^ ------ DEALING WITH THE BLOCK FIELD FROM THIS MODULE
        Nov  9 17:21 1989  rmmax.4gl Page 6

------ WHEN UPDATING *MAX ?!?!?!?!?!?!?!??

ELSE
                        UPDATE inven
                        SET (auth, avail) = (rmallow[x], rmallow[x] - rmupd.sold)
                        WHERE inven.rowid = rmupd.rowid
                END IF

END FOR
        END FOR

# THIS FUNCTION KEEP TRACK OF THE MINIMUM AND MAXIMUM DATES
# USED FOR THE SUMMATION OF COLUMNS AFTER INPUT

CALL mmdata(rmadd.propcd, rmadd.stdt, rmadd.enddt)

END FUNCTION
            Nov  9 17:21 1989  rmsinp.4gl Page 1

{
        : Module:      rmsinp.4gl
        :
        : Function:    rmsinp()
        :
        : Purpose:     Allows for input of for rooms to be sold by rate
        :              category.
        :
        : Author:      Ken Dowling
        :
        :                By           Date              Action
        : Revisions:
        :
        : HYATT CONFIDENTIAL
        : Copyright (C) 1989
        :
        }
        DATABASE inv_sgl GLOBALS
                "glob.4gl"

DEFINE rms ARRAY[14] OF CHAR(4),
                numrma ARRAY[14]      OF CHAR(1),
                numrmb ARRAY[14]      OF CHAR(1),
                maxav                 INTEGER,
                maxbl                 INTEGER,
                ar_row                SMALLINT,
                siz_rms               SMALLINT,
                k, i, x, ac, sr SMALLINT FUNCTION rmsinp()

DEFINE rmadd RECORD
                propcd LIKE hotel.propcd,
                stdt    DATE,
                enddt   DATE,
                ratecat LIKE rate_lu.ratecat
                END RECORD,
```

```
                blksell   SMALLINT

LET maxav = 0
LET maxbl = 0

OPEN WINDOW w_para AT 4,3 WITH FORM "parin" ATTRIBUTE (BORDER)

CALL parainp() RETURNING rmadd.*

IF rmadd.propcd IS NULL THEN
Nov  9 17:21 1989   rmsinp.4gl Page 2

CLOSE WINDOW w_para
  ELSE

OPEN WINDOW w_avlent AT 13,3 WITH FORM "avlent" ATTRIBUTE (BORDER)

# SELECT AND DISPLAY ROOM TYPES FOR THE DESIRED HOTEL

DECLARE rm_curs CURSOR FOR
        SELECT roomtype FROM room
        WHERE rmadd.propcd = room.propcd
        ORDER BY roomtype LET ar_row = 1

FOREACH rm_curs INTO rms[ar_row]
        LET ar_row = ar_row + 1
END FOREACH

LET siz_rms = ar_row - 1

IF siz_rms = 0 THEN
        CALL mess("No valid rooms set up for this hotel.")
        RETURN
ELSE
        FOR x = 1 TO siz_rms
                DISPLAY rms[x] TO sc_rmtpe[x].rmtype
        END FOR
END IF

#  OPEN WINDOW WITH MENU TO SELECT WHICH DATA TO INPUT IN
#  THE SCREEN

FOR i = 1 TO siz_rms
        INITIALIZE numrma[i] TO NULL
        INITIALIZE numrmb[i] TO NULL
END FOR MENU "Valid Rooms"

COMMAND "Rooms" "Input available rooms data"
                CALL rooms()

COMMAND "Block" "Input block room data"
                CALL block()

COMMAND "Save and exit" "Record input and exit"
Nov  9 17:21 1989   rmsinp.4gl Page 3

IF int_flag != 0 THEN
          CALL mess("Interupt entered, no data to save.")
          LET int_flag = 0
          EXIT MENU
     ELSE
          IF maxav IS NOT NULL THEN
               CALL blkcheck(rmadd.*)
```

```
                                                RETURNING blksell
                                        IF blksell = 0 THEN
                                                CALL savex(rmadd.*)
                                                EXIT MENU
                                        ELSE
                                                CALL mess("Cannot create block, not enoug
                                        END IF
                                ELSE
                                        CALL mess("No data to save.")
                                        NEXT OPTION "Rooms"
                                END IF
                        END IF COMMAND "Discard and exit" "Discard input and exit"
                        CALL mess("Data discarded.")
                        EXIT MENU

END MENU

CLOSE WINDOW w_avlent

CLOSE WINDOW w_para

END IF

END FUNCTION this function allows the input of maximum rooms available and
which room types are valid for the rate category specified in
# addrate.4gl

FUNCTION rooms()

INPUT BY NAME maxav WITHOUT DEFAULTS

AFTER FIELD maxav
                IF maxav < 0 THEN
                        CALL mess("Maximum block must greater then 0.")
                        NEXT FIELD maxav
                END IF
Nov  9 17:21 1989   rmsinp.4gl Page 4

IF maxbl != 0 THEN
                        IF maxbl > maxav THEN
                                CALL mess("Maximum available must be <= maximum b
                                NEXT FIELD maxav
                        END IF
                END IF

END INPUT

IF int_flag != 0 THEN
        CALL mess("Interupt entered, data not recorded.")
        LET maxav = 0
        DISPLAY BY NAME maxav
        # LET int_flag = 0
ELSE
        INPUT ARRAY numrma WITHOUT DEFAULTS FROM sc_atp.*

AFTER FIELD a_rmtype
                LET sr = SCR_LINE()
                LET ac = ARR_CURR()
                IF ac = siz_rms THEN
                        EXIT INPUT
                END IF

END INPUT

IF int_flag != 0 THEN
                LET maxav = 0
                DISPLAY BY NAME maxav
                FOR i = 1 TO siz_rms
```

```
                                    INITIALIZE numrma[i] TO NULL
                                    DISPLAY numrma[i] TO sc_atp[1].*
                    # LET int_flag = 0
                    END FOR
            END IF
    END IF

END FUNCTION

# This function allows for the input of Block room data.
    # Called from menu above
    #####

FUNCTION block()

INPUT BY NAME maxbl WITHOUT DEFAULTS

AFTER FIELD maxbl
                IF maxbl < 0 THEN
```

Nov 9 17:21 1989   rmsinp.4gl Page 5

```
                    CALL mess("Maximum block must be greater than 0.")
                    NEXT FIELD maxbl
                END IF IF maxav != 0 THEN
                    IF maxbl > maxav THEN
                        CALL mess("Maximum block must be >= maximum autho
                        NEXT FIELD maxbl
                    END IF
                END IF

END INPUT

IF int_flag = 0 THEN
                INPUT ARRAY numrmb WITHOUT DEFAULTS FROM sc_btp.*

BEFORE FIELD b_rmtype
                    IF maxbl = 0 THEN
                        CALL mess("Block rooms = 0, No rooms to block.")
                        EXIT INPUT
                    END IF AFTER FIELD b_rmtype
                    LET sr = SCR_LINE()
                    LET ac = ARR_CURR()

IF ac = siz_rms THEN
                    EXIT INPUT
                END IF

IF int_flag != 0 THEN
                    # LET int_flag = 0
                    CALL mess("Interrupt entered, Block data discarded")
                    LET maxbl = 0
                    DISPLAY BY NAME maxbl
                    FOR i = 1 TO 14
                            INITIALIZE numrmb[i] TO NULL
                            DISPLAY numrmb[i] TO sc_btp.*
                    END FOR
                END IF END INPUT
        ELSE
                # LET int_flag = 0
                CALL mess("Interrupt entered, Block data discarded")
                LET maxbl = 0
                DISPLAY BY NAME maxbl
                FOR i = 1 TO 14
                        INITIALIZE numrmb[i] TO NULL
                        DISPLAY numrmb[i] TO sc_btp.*
```

```
        END FOR
END IF

END FUNCTION

THIS FUNCTION SAVES THE INVENTORY DATA.

FUNCTION savex(upd)

DEFINE   upd RECORD
                propcd LIKE hotel.propcd,
                stdt    DATE,
                enddt   DATE,
                ratecat LIKE rate_lu.ratecat
         END RECORD,
         rite RECORD
                rowid   INTEGER,
                propcd  LIKE inven.propcd,
                invdate LIKE inven.invdate,
                ratecat LIKE inven.ratecat,
                roomtype LIKE inven.roomtype,
                auth    LIKE inven.auth,
                avail   LIKE inven.avail,
                block   LIKE inven.block,
                remblock LIKE inven.remblock,
                sold    LIKE inven.sold
         END RECORD,
         sel                CHAR(200),      # USED TO BUILD SELECT STATEMENT
         siz_del, arow      SMALLINT,       # COUNTERS
         insbl              SMALLINT,       # BLOCK VALUE TO INSERT INTO inven
         inmaxav            SMALLINT,       # AVAILABLE VALUE TO INSERT
         inrembl            SMALLINT,       # REMAINING BLOCK TO INSERT
         dt                 INTEGER         # COUNTER FOR DATES

#  THIS SETS THE ROOM TYPE *MAX AND ASSOCIATES A "Y" WITH IT

LET siz_rms = siz_rms + 1
LET rms[siz_rms] = "*MAX"
LET numrma[siz_rms] = "Y"
LET numrmb[siz_rms] = "Y"

#  THIS ALLOWS ONLY BLOCK ROOMS TO BE ENTERED ON THE SCREEN AND DEFAULTS
#  THE ROOM INNFORMATION TO THE SAME TO SAVE ON INPUT WHEN CREATING A
#  BLOCK WITH THE SAME AMOUNT AS ROOMS.

IF maxav IS NULL OR maxav = 0 THEN
        IF maxbl IS NOT NULL THEN
                LET maxav = maxbl
                FOR i = 1 TO siz_rms
                        LET numrma[i] = numrmb[i]
                END FOR
        END IF
END IF LET sel = "SELECT rowid, *",
        " FROM inven",
        " WHERE inven.propcd = \"", upd.propcd CLIPPED,"\"",
        " AND inven.invdate = ?",
        " AND inven.ratecat = \"", upd.ratecat CLIPPED,"\"",
        " AND inven.roomtype = ?"

PREPARE sel_1 FROM sel

FOR dt = upd.stdt TO upd.enddt
    FOR i = 1 TO 2
        FOR k = 1 TO siz_rms

OPEN sel_1 USING dt, rms[k]

FETCH sel_1 INTO rite.*
```

```
IF numrma[k] IS NOT NULL THEN
        IF numrmb[k] IS NULL THEN
                LET insbl = 0
        ELSE
                LET insbl = maxbl
        END IF IF status = NOTFOUND THEN
                INSERT INTO inven (propcd, invdate, ratecat, roomtype, auth,
                                avail, block, remblock, sold)
                VALUES (upd.propcd, dt, upd.ratecat, rms[k], maxav, maxav, insbl,
        ELSE
                LET inmaxav = mmax(0, maxav - rite.sold)
                LET inrembl = mmax(0, insbl - rite.sold)
                UPDATE inven
                SET (auth, avail, block, remblock) = (maxav, inmaxav, insbl, inre
                WHERE inven.rowid = rite.rowid
        END IF ELSE
        IF status = NOTFOUND THEN
                INSERT INTO inven (propcd, invdate, ratecat, roomtype, auth,
                                avail, block, remblock, sold)
                VALUES (upd.propcd, dt, upd.ratecat, rms[k], 0, 0, 0, 0, 0)
        ELSE
                UPDATE inven
                SET (auth, avail, block, remblock) = (0, 0, 0, 0)
                WHERE inven.rowid = rite.rowid
        END IF
END IF

END FOR
    END FOR
END FOR

# THIS FUNCTION KEEPS TRACK OF THE MAXIMUM AND MINIMUM DATES
# USED FOR SUMMATION OF THE COLUMNS AFTER INPUT

CALL mmdata(upd.propcd, upd.stdt, upd.enddt)

END FUNCTION

FUNCTION blkcheck(blkadd)

DEFINE blkadd RECORD
        propcd  LIKE hotel.propcd,
        stdt    DATE,
        enddt   DATE,
        ratecat LIKE rate_lu.propcd
        END RECORD, blkflag         SMALLINT,   # 1 IF BLOCK CANNOT BE CREATED, 0 OTHERWISE
        chk RECORD
                invdate         LIKE inven.invdate,
                avail           LIKE inven.avail,
                remblock        LIKE inven.remblock
        END RECORD LET blkflag = 0

DECLARE b_curs CURSOR FOR
        SELECT invdate, avail, remblock
        FROM inven
        WHERE inven.propcd = blkadd.propcd
        AND inven.invdate >= blkadd.stdt
        AND inven.invdate <= blkadd.enddt
        AND inven.roomtype = "*MAX"
        AND inven.ratecat = "*MAX"

FOREACH b_curs INTO chk.*
```

```
            IF chk.avail < chk.remblock + maxbl THEN
                LET blkflag = 1
            END IF

END FOREACH

RETURN blkflag

END FUNCTION
{
: Module:     rt_blck.4gl
:
: Function:   rate_rmtp_unblk(siz_sel)
:
: Purpose:    Check for enough blocked inventory
:             for the specific rate category.
:
: Author:     Ken Dowling
:
:             By          Date            Action
: Revisions:
:
: HYATT CONFIDENTIAL
: Copyright (C) 1989
:
}
DATABASE inv_sgl GLOBALS
    "glob.4gl"

FUNCTION rate_blck(siz_sel)

DEFINE   siz_sel     SMALLINT,
         x           SMALLINT,    # COUNTER NUMBER OF ROWS (4 ROWS PER DAY)
         y           SMALLINT,    # COUNTER REPRESENTING DAYS
         cont        SMALLINT,    # 0 IF OK TO CONTINUE
         blk_sel     ARRAY[7] OF RECORD
            aio      SMALLINT,
            rbio     SMALLINT,
            dt       DATE
         END RECORD LET y = 1

CHECK FOR UNBLOCKED INVENTORY AVAILABLE FOR RATE
# Aio - RBio >= r
FOR x = 1 TO siz_sel
    # INCREMENT DAY COUNTER
    IF ( x != 1 ) THEN
       IF ( rminfo[x].invdate != rminfo[x-1].invdate ) THEN
          LET y = y + 1
       END IF
    END IF IF ( rminfo[x].ratecat MATCHES "*MAX" ) AND
       ( rminfo[x].roomtype NOT MATCHES "*MAX" ) THEN
          IF rminfo[x].avail - rminfo[x].remblock < sel.numrm THEN
             # STORE Aio AND RBio AND DATE
             LET blk_sel[y].aio = rminfo[x].avail
             LET blk_sel[y].rbio = rminfo[x].remblock
             LET blk_sel[y].dt = rminfo[x].invdate
             LET cont = 50
             CALL mess("Check for unblocked inven for rate failed.")
          END IF
    END IF
END FOR

# IF NOT AVAILABLE
# CHECK FOR BLOCKED INVENTORY AVAILABLE FOR RATE
# RBij >= r - ( Aio - RBio )
LET y = 1
LET x = 1
```

```
IF cont = 50 THEN
   FOR x = 1 TO siz_sel
       IF ( x != 1 ) THEN
          IF ( rminfo[x].invdate != rminfo[x-1].invdate ) THEN
             LET y = y + 1
          END IF
       END IF IF ( rminfo[x].ratecat   NOT MATCHES "*MAX" ) AND
          ( rminfo[x].roomtype NOT MATCHES "*MAX" ) AND
          ( rminfo[x].invdate = blk_sel[y].dt ) AND
          ( blk_sel[y].dt IS NOT NULL ) THEN
             IF ( rminfo[x].remblock >=
                 sel.numrm - ( blk_sel[y].aio - blk_sel[y].rbio ) ) THEN
                  LET cont = 0
                  LET y = y + 1
             ELSE
                  # NOT AVAILABLE DON'T SELL ROOM
                  LET cont = 100
                  CALL mess("Check for blocked inven for rate failed.")
                  EXIT FOR
             END IF
       END IF
   END FOR
END IF RETURN cont END FUNCTION
{
: Module:      sell.4gl
:
: Function:    sell()
:
: Purpose:     To check rooms available and call function to decrement
:              or increment inventory.
:
: Author:      Ken Dowling
:
:              By         Date            Action
: Revisions:
:
: HYATT CONFIDENTIAL
: Copyright (C) 1989
:
}
DATABASE inv_sgl GLOBALS
      "glob.4gl"

FUNCTION sell()

DEFINE  blkchk  ARRAY[28] OF RECORD
            invdate          LIKE inven.invdate,
            avail            LIKE inven.avail,
            remblock         LIKE inven.remblock
        END RECORD,
        ar_row               SMALLINT,
        x, y, i              SMALLINT,
        ans                  CHAR(1),
        cont                 SMALLINT,   # 0 if still OK to sell room
        ln_count             SMALLINT,
        pratt                SMALLINT DECLARE s_curs CURSOR FOR
        SELECT rowid, ratecat, roomtype, invdate,
               auth, avail, block, remblock, sold
        FROM inven
        WHERE propcd = sel.propcd
        AND invdate >= sel.stdt
        AND invdate < sel.enddt
        AND (ratecat = "*MAX" OR ratecat = sel.ratecat)
```

```
            AND (roomtype = "*MAX" OR roomtype = sel.roomtype)
        ORDER BY invdate prompt attempt -- set to 1 if prompt occurs, so prompt will only occur once.
LET cont = 0
LET ln_count = 0
LET ar_row = 1
LET y = 1

FOREACH s_curs INTO rminfo[ar_row].*
        INITIALIZE blkrm[ar_row] TO NULL
        INITIALIZE blksell[ar_row] TO NULL
        LET ar_row = ar_row + 1
END FOREACH LET siz_sel = ar_row - 1

CHECK GENERAL AVAILABILITY
CALL gen_avl(siz_sel) RETURNING cont

# CHECK TO SEE IF SELLING BLOCKED INVENTORY
CALL blck_rm(siz_sel)

IF cont != 0 THEN
    CALL mess("Reservation not completed.")
    RETURN
ELSE
    # CHECK FOR UNBLOCKED INVENTORY AVAILABILITY
    CALL unblk_avl(siz_sel) RETURNING cont
        IF cont != 0 THEN
            CALL mess("Reservation not completed.")
            RETURN
        ELSE
            # CHECK UNBLOCKED INVENTORY AVAILABLE FOR RATE AND ROOMTYPE
            CALL rate_blck(siz_sel) RETURNING cont
                IF cont != 0 THEN
                    CALL mess("Reservation not completed.")
                    RETURN
                ELSE
                    CALL room_blck(siz_sel) RETURNING cont
                    IF cont != 0 THEN
                        CALL mess("Reservation not completed.")
                        RETURN
                    ELSE
                        CALL upinv()
                    END IF
                END IF
        END IF
END IF

END FUNCTION

FUNCTION upinv()
DEFINE    inav           SMALLINT,
          inrembl        SMALLINT,
          insold         SMALLINT,
          bup            CHAR(1),
          x, y           SMALLINT LET y = 1

THIS NEXT PORTION OF CODE IS VERY VERY VERY EMBARASSING.
#  PLEASE DON'T HOLD IT AGAINST ME, BUT IT WAS THE ONLY WAY
#  I COULD MAKE THIS WORK. . .

FOR x = 1 TO siz_sel
   IF x != 1 THEN
      IF rminfo[x].invdate = rminfo[x-1].invdate THEN
         IF blkrm[y] MATCHES "N" THEN
                LET inav = mmax(0,rminfo[x].avail - sel.numrm)
                LET insold = mmax(0,rminfo[x].sold + sel.numrm)
```

```
                    UPDATE inven
                        SET (avail, sold) = (inav, insold)
                        WHERE rowid = rminfo[x].rowid
            ELSE
                    LET inrembl = mmax(0,rminfo[x].remblock - sel.numrm)
                    LET inav = mmax(0,rminfo[x].avail - sel.numrm)
                    LET insold = mmax(0,rminfo[x].sold + sel.numrm)

UPDATE inven
                        SET (avail, remblock, sold) =
                                (inav, inrembl, insold)
                        WHERE rowid = rminfo[x].rowid
            END IF ELSE
            LET y = y + 1
            IF blkrm[y] MATCHES "N" THEN
                    LET inav = mmax(0,rminfo[x].avail - sel.numrm)
                    LET insold = mmax(0,rminfo[x].sold + sel.numrm)

UPDATE inven
                        SET (avail, sold) = (inav, insold)
                        WHERE rowid = rminfo[x].rowid
            ELSE
                    LET inrembl = mmax(0,rminfo[x].remblock - sel.numrm)
                    LET inav = mmax(0,rminfo[x].avail - sel.numrm)
                    LET insold = mmax(0,rminfo[x].sold + sel.numrm)

UPDATE inven
                        SET (avail, remblock, sold) =
                                (inav, inrembl, insold)
                        WHERE rowid = rminfo[x].rowid
            END IF
        END IF ELSE
        IF blkrm[y] MATCHES "N" THEN
                LET inav = mmax(0,rminfo[x].avail - sel.numrm)
                LET insold = mmax(0,rminfo[x].sold + sel.numrm)

UPDATE inven
                    SET (avail, sold) = (inav, insold)
                    WHERE rowid = rminfo[x].rowid
        ELSE
                LET inrembl = mmax(0,rminfo[x].remblock - sel.numrm)
                LET inav = mmax(0,rminfo[x].avail - sel.numrm)
                LET insold = mmax(0,rminfo[x].sold + sel.numrm)

UPDATE inven
                    SET (avail, remblock, sold) =
                            (inav, inrembl, insold)
                    WHERE rowid = rminfo[x].rowid
        END IF
    END IF

END FOR

END FUNCTION

{
: Module:        set_opts.4gl
:
: Function:      set_opts()
:
: Purpose:       Setup of function key assignments.
:
: Author:        Ronald Roades
:
:                By         Date           Action
: Revisions:
:
: HYATT CONFIDENTIAL
: Copyright (C) 1988, 1989
:
}
```

```
DATABASE inv_sgl

FUNCTION set_opts()

OPTIONS
        INSERT KEY F4,
        DELETE KEY F5,
        NEXT KEY F2,
        PREVIOUS KEY F3,
        ACCEPT KEY F1

HELP KEY is F8 - handled application specific

END FUNCTION

{
: Module:     setfkey610.4gl
:
: Function:   setfkeys()
:
: Purpose:    Setup of function keys shown on the bottom of the screen.
:
: Author:     Ronald Roades
:
:             By         Date             Action
: Revisions:
:
: HYATT CONFIDENTIAL
: Copyright (C) 1988, 1989
:
}

DEFINE answer    CHAR(1)        #global to source file

FUNCTION setfkeys()

DEFINE esc     CHAR(1)

#       PROMPT "Are you using an AT&T MODEL 610 VDT ? (Y/ ) "
#             FOR CHAR answer

IF answer MATCHES "[Yy]" THEN

LET esc = ASCII 27

DISPLAY esc, "[1;3;0;1q     F1    ACCEPT ",esc, "Oc",
                    esc, "[2;3;0;1q     F2    PAGE DWN",esc, "Od",
                    esc, "[3;3;0;1q     F3    PAGE UP ",esc, "Oe",
                    esc, "[4;3;0;1q     F4    INS ROW ",esc, "Of",
                    esc, "[5;3;0;1q     F5    DEL ROW ",esc, "Og",
                    esc, "[6;3;0;1q     F6    SEARCH ",esc, "Oh",
                    esc, "[7;3;0;1q     F8    HELP   ",esc, "Oj",
                    esc, "[8;0;0;1q     DEL   IGNORE "
            DISPLAY esc, "[?1l1",              #Block cursor
                    esc, "[?12h"
#       END IF
END FUNCTION FUNCTION resetfkeys()
        DEFINE esc     CHAR(1)

#IF answer MATCHES "[Yy]" THEN
            LET esc = ASCII 27

DISPLAY esc, "[1;0;0;1q    F1                ",
                  , esc, "[2;0;0;1q    F2                ",
                    esc, "[3;0;0;1q    F3                ",
                    esc, "[4;0;0;1q    F4                ",
                    esc, "[5;0;0;1q    F5                ",
                    esc, "[6;0;0;1q    F6                ",
                    esc, "[7;0;0;1q    F7                ",
                    esc, "[8;0;0;1q    F8                "
        #END IF

END FUNCTION
```

```
{
: Module:      tablemenu.4gl
:
: Function:    tblmenu()
:
: Purpose:     Displays menu for maintenance of database tables.
:
:
: Author:      Ken Dowling
:
:             By          Date            Action
: Revisions:
:
: HYATT CONFIDENTIAL
: Copyright (C) 1989
:
}
DATABASE inv_sgl GLOBALS
        "glob.4gl"

FUNCTION tblmenu()

MENU "Tables"

COMMAND KEY(T) "roomTypes" "Modify roomtypes for a specific hotel."
                CALL rmmnt()

COMMAND "Hotel" "Modify list of valid hotels"
                CALL htlmnt()

COMMAND KEY(R) "Rates" "Modify list of valid rate categories"
                CALL spmnt()                    ;

COMMAND "Exit" "Return to main menu"
                EXIT MENU

END MENU

END FUNCTION

FUNCTION datemenu()

LET cmm = "N"

MENU "Dates"
        COMMAND "Rooms" "Set availability for roomtypes"
                CALL rmmax()

COMMAND "Categories" "Set availability for rate categories"
                CALL rmsinp()

COMMAND "Exit" "Return to main menu"
                IF cmm = "Y" THEN
                        MESSAGE "Checking inventory status. . ."
                        CALL colchk()
                END IF
                EXIT MENU

END MENU

END FUNCTION
{
: Module:      unblk_avl.4gl
:
: Function:    unblk_avl()
:
: Purpose:     To check if there is enough unblocked inventory
:              available.  RULE 5 =  Aoo - RBoo >= r
:
: Author:      Ken Dowling
:
:             By          Date            Action
: Revisions:
```

```
: HYATT CONFIDENTIAL
: Copyright (C) 1989
:
}
DATABASE inv_sgl

GLOBALS
       "glob.4gl"

FUNCTION unblk_avl(siz_sel)

DEFINE  siz_sel      SMALLINT,
        dt           DATE,
        cont         SMALLINT,
        x, k         SMALLINT FOR x = 1 TO siz_sel
    IF ( rminfo[x].ratecat MATCHES "*MAX" )  AND
       ( rminfo[x].roomtype MATCHES "*MAX" ) THEN
           IF ( rminfo[x].avail - rminfo[x].remblock >= sel.numrm ) THEN
              LET cont = 0
           ELSE
              LET k = sel.numrm - ( rminfo[x].avail - rminfo[x].remblock )
              LET dt = rminfo[x].invdate
              CALL blk_inv(siz_sel, k, dt) RETURNING cont
              #CALL mess("Need to check if blocked inven avail.")
              IF ( cont != 0 ) THEN
                 EXIT FOR
              END IF
           END IF
    END IF
END FOR RETURN cont

END FUNCTION

FUNCTION blk_inv(siz_sel,k, dt)

DEFINE siz_sel       SMALLINT,
       y             SMALLINT,    # COUNTER FOR DAYS
       cont          SMALLINT,
       x             SMALLINT,    #
       dt            DATE,        # CURRENT DATE BEING EVALUATED
       k             SMALLINT     # k = r - (Aoo - RBoo)

FOR x = 1 TO siz_sel
    IF ( rminfo[x].ratecat NOT MATCHES "*MAX" )  OR
       ( rminfo[x].roomtype NOT MATCHES "*MAX" ) AND
       ( dt = rminfo[x].invdate ) THEN
           IF ( rminfo[x].remblock < k ) THEN
              CALL mess("Check for blocked inven failed.")
              LET cont = 100
              EXIT FOR
           END IF
    END IF
END FOR RETURN cont

END FUNCTION
```

This is all of the source code from the test system. The modules are commented with a program header which gives a brief explanation on what function the module performs. Not all of the modules pertain directly to the algorithms.

The main algorithms checking inventory for a sell are in the following modules:
    sell.4gl
    gen_avl.4gl
    unblk_avl.4gl
    rt_blck.4gl
    rm_blck.4gl
    blck_rm.4gl These modules are commented with the formulae from the flow chart titled "SELL INVENTORY CHECKS."

The following modules are used when establishing inventory:
    bigsum.4gl
    rmsinp.4gl
    rmmax.4gl DATABASE inv_sgl

SCREEN
{

MAX [f006|f006|f006|f006|f006|f006|f006|f006|f006|f006|f006|f006|f006|f006]
ROOMS
[f009] [a]  [a]  [a]  [a]  [a]  [a]  [a]  [a]  [a]  [a]  [a]  [a]  [a]  [a]

BLOCK
[f010] [b]  [b]  [b]  [b]  [b]  [b]  [b]  [b]  [b]  [b]  [b]  [b]  [b]  [b]

}
END

TABLES
hotel
rate_lu
room

ATTRIBUTES
f006 = FORMONLY.rmtype, NOENTRY, REVERSE;
a = FORMONLY.a_rmtype TYPE CHAR, INCLUDE = (NULL, "Y"), REVERSE, UPSHIFT;
b = FORMONLY.b_rmtype TYPE CHAR, INCLUDE = (NULL, "Y"), REVERSE, UPSHIFT;
f009 = FORMONLY.maxav TYPE SMALLINT, REVERSE;
f010 = FORMONLY.maxbl TYPE SMALLINT, REVERSE;
END INSTRUCTIONS
DELIMITERS " "
SCREEN RECORD sc_rmtpe[14](rmtype)
SCREEN RECORD sc_atp[14](a_rmtype)
SCREEN RECORD sc_btp[14](b_rmtype)
END database FORMONLY
screen
{
[a|f001|f002                         |b]
[a|f001|f002                         |b]
[a|f001|f002                         |b]
[a|f001|f002                         |b]
[a|f001|f002                         |b]
[a|f001|f002                         |b]
[a|f001|f002                         |b]
[a|f001|f002                         |b]
[a|f001|f002                         |b]
[a|f001|f002                         |b]
[a|f001|f002                         |b]
[a|f001|f002                         |b]
[a|f001|f002                         |b]
[a|f001|f002                         |b]
}
end
attributes
a = FORMONLY.a TYPE CHAR, INCLUDE = (NULL), AUTONEXT;
f001 = FORMONLY.msgln, NOENTRY;
f002 = FORMONLY.msgdes, NOENTRY;
b = FORMONLY.b TYPE CHAR, INCLUDE = (NULL), NOENTRY;
INSTRUCTIONS
DELIMITERS " "
SCREEN RECORD ct[15] (FORMONLY.a, FORMONLY.msgln, FORMONLY.msgdes, FORMONLY.b)
end database FORMONLY
screen
{
[a|f001 ] [f002                      |b]
[a|f001 ] [f002                      |b]
[a|f001 ] [f002                      |b]
[a|f001 ] [f002                      |b]

```
[a|f001 ] [f002                    |b]
[a|f001 ] [f002                    |b]
[a|f001 ] [f002                    |b]
[a|f001 ] [f002                    |b]
[a|f001 ] [f002                    |b]
[a|f001 ] [f002                    |b]
[a|f001 ] [f002                    |b]
[a|f001 ] [f002                    |b]
[a|f001 ] [f002                    |b]
[a|f001 ] [f002                    |b]
}
end
attributes
a = FORMONLY.a TYPE CHAR, INCLUDE = (NULL), AUTONEXT;
f001 = FORMONLY.msgln, NOENTRY;
f002 = FORMONLY.msgdes, NOENTRY;
b = FORMONLY.b TYPE CHAR, INCLUDE = (NULL), NOENTRY;
INSTRUCTIONS
DELIMITERS " "
SCREEN RECORD pt[15] (FORMONLY.a, FORMONLY.msgln, FORMONLY.msgdes, FORMONLY.b)
end database inv_sgl
screen
{
        HOTEL TABLE MAINTENANCE

[f000 ]   [f001                     ]
[f000 ]   [f001                     ]
[f000 ]   [f001                     ]
[f000 ]   [f001                     ]
[f000 ]   [f001                     ]
[f000 ]   [f001                     ]
[f000 ]   [f001                     ]
[f000 ]   [f001                     ]
[f000 ]   [f001                     ]
[f000 ]   [f001                     ]
[f000 ]   [f001                     ]
[f000 ]   [f001                     ]
[f000 ]   [f001                     ]
[f000 ]   [f001                     ]
}
end
tables
hotel
attributes
f000 = hotel.propcd,UPSHIFT,REVERSE;
f001 = hotel.htlnm,UPSHIFT,REVERSE;
end
INSTRUCTIONS
DELIMITERS " "
SCREEN RECORD scr[15](propcd, htlnm)
END database inv_sgl
screen
{
RATE TYPE       [e]        [f009                         ]
PROPERTY CODE   [f000 ]    [f000a                        ]

RATE      SGL      DBL       XP       CHILD    TAX COMMISSION     MIN    MAX
 CATEGORY                                       (Y/N)(Y/N) %/AMT   OCC    OCC
 [f003] [f004    ][f005    ][f006    ][f007    ] [a]  [b] [f008 ]  [c]    [d]
 [f003] [f004    ][f005    ][f006    ][f007    ] [a]  [b] [f008 ]  [c]    [d]
 [f003] [f004    ][f005    ][f006    ][f007    ] [a]  [b] [f008 ]  [c]    [d]
 [f003] [f004    ][f005    ][f006    ][f007    ] [a]  [b] [f008 ]  [c]    [d]
 [f003] [f004    ][f005    ][f006    ][f007    ] [a]  [b] [f008 ]  [c]    [d]
 [f003] [f004    ][f005    ][f006    ][f007    ] [a]  [b] [f008 ]  [c]    [d]
 [f003] [f004    ][f005    ][f006    ][f007    ] [a]  [b] [f008 ]  [c]    [d]
 [f003] [f004    ][f005    ][f006    ][f007    ] [a]  [b] [f008 ]  [c]    [d]
 [f003] [f004    ][f005    ][f006    ][f007    ] [a]  [b] [f008 ]  [c]    [d]
}
end
```

```
tables
hotel
rates
attributes
f000 = FORMONLY.propcd, REVERSE, UPSHIFT;
f000a = hotel.htlnm, REVERSE, NOENTRY;
f003 = FORMONLY.ratecat, REVERSE, UPSHIFT,REQUIRED;
f004 = FORMONLY.sgl, REVERSE,REQUIRED;
f005 = FORMONLY.dbl, REVERSE;
f006 = FORMONLY.xp, REVERSE;
f007 = FORMONLY.child, REVERSE;
a = FORMONLY.taxyn TYPE CHAR, REVERSE, UPSHIFT, INCLUDE = (Y,N),REQUIRED;
b = FORMONLY.commyn TYPE CHAR, REVERSE, UPSHIFT, INCLUDE = (Y,N),REQUIRED;
f008 = FORMONLY.commamt, REVERSE;
c = FORMONLY.minocc, REVERSE,REQUIRED;
d = FORMONLY.maxocc, REVERSE,REQUIRED;
e = FORMONLY.ratetype, REVERSE, UPSHIFT,REQUIRED;
f009 = FORMONLY.rttypedes, REVERSE, NOENTRY;
end
INSTRUCTIONS
DELIMITERS " "
SCREEN RECORD sc_monrt[10](ratecat thru maxocc)
END database inv_sgl
SCREEN
{
        HOTEL CODE      [f000 ]   [f021                            ]
        START DATE      [f001     ]   END DATE    [f002            ]

[f006|f006|f006|f006|f006|f006|f006|f006|f006|f006|f006|f006|f006|f006]

[f004] [f007|f008|f009|f010|f011|f012|f013|f014|f015|f016|f017|f018|f019|f020]
[f004] [f007|f008|f009|f010|f011|f012|f013|f014|f015|f016|f017|f018|f019|f020]
[f004] [f007|f008|f009|f010|f011|f012|f013|f014|f015|f016|f017|f018|f019|f020]
[f004] [f007|f008|f009|f010|f011|f012|f013|f014|f015|f016|f017|f018|f019|f020]
[f004] [f007|f008|f009|f010|f011|f012|f013|f014|f015|f016|f017|f018|f019|f020]
[f004] [f007|f008|f009|f010|f011|f012|f013|f014|f015|f016|f017|f018|f019|f020]
[f004] [f007|f008|f009|f010|f011|f012|f013|f014|f015|f016|f017|f018|f019|f020]
[f004] [f007|f008|f009|f010|f011|f012|f013|f014|f015|f016|f017|f018|f019|f020]
[f004] [f007|f008|f009|f010|f011|f012|f013|f014|f015|f016|f017|f018|f019|f020]
[f004] [f007|f008|f009|f010|f011|f012|f013|f014|f015|f016|f017|f018|f019|f020]

DATE DISPLAYED   [f022       ]
                                        VALUES [f023                 ]
}
end
tables
inven
hotel
attributes
f000 = FORMONLY.propcd, REVERSE, UPSHIFT;
f001 = FORMONLY.stdt TYPE DATE, DEFAULT = TODAY, REVERSE, UPSHIFT;
f002 = FORMONLY.enddt, REVERSE, UPSHIFT;
f004 = FORMONLY.ratecat, REVERSE,NOENTRY;
f006 = FORMONLY.roomtype, REVERSE, NOENTRY;
f007 = FORMONLY.avail1, REVERSE, NOENTRY;
f008 = FORMONLY.avail2, REVERSE, NOENTRY;
f009 = FORMONLY.avail3, REVERSE, NOENTRY;
f010 = FORMONLY.avail4, REVERSE, NOENTRY;
f011 = FORMONLY.avail5, REVERSE, NOENTRY;
f012 = FORMONLY.avail6, REVERSE, NOENTRY;
f013 = FORMONLY.avail7, REVERSE, NOENTRY;
f014 = FORMONLY.avail8, REVERSE, NOENTRY;
f015 = FORMONLY.avail9, REVERSE, NOENTRY;
f016 = FORMONLY.avail10, REVERSE, NOENTRY;
f017 = FORMONLY.avail11, REVERSE, NOENTRY;
f018 = FORMONLY.avail12, REVERSE, NOENTRY;
f019 = FORMONLY.avail13, REVERSE, NOENTRY;
f020 = FORMONLY.avail14, REVERSE, NOENTRY;
f021 = FORMONLY.htlnm, REVERSE, NOENTRY;
f022 = FORMONLY.disdate, REVERSE, NOENTRY;
f023 = FORMONLY.disval, REVERSE, NOENTRY;
end
```

```
instructions
DELIMITERS " " ,
SCREEN RECORD sc_rm[14]  (roomtype)
SCREEN RECORD sc_rt[10]  (ratecat)
SCREEN RECORD sc_av[10]  (avail1, avail2, avail3, avail4, avail5, avail6,
                          avail7, avail8, avail9, avail10, avail11, avail12,
                          avail13, avail14)
END
```

While a specific embodiment of the invention has been shown and described, it is to be understood that numerous changes and modifications may be made therein without departing from the scope, spirit and intent of the invention as set forth in the appended claims.

What is claimed is:

1. An inventory-control system for allocating items of inventory in an optimal manner, comprising:

inventory comprising a plurality of different groups of inventory items, each said group having at least one inventory item therein, each said inventory item in each said group being uniquely characterized from an inventory item in another said group, each said inventory item having a first characteristic and a second characteristic, with one of said first and second characteristics thereof being equal to a characteristic of at least one other inventory item of at least one other said group;

a computer, said computer having memory means for storing therein information representative of said group of inventory items and each said inventory item in a respective said group;

said memory means comprising:

a first portion for storing therein data by said first and second characteristics of each said inventory item, said data being representative of the total maximum inventory of inventory items available for potential use;

a second portion for storing data therein by said first and second characteristics of each said inventory item, said data being representative of protected inventory items in said groups; and first generating means for generating computer signals of said representative data of said first portion as a first matrix array of n rows by m columns, each said row defining a specific, unique said first characteristic and each said column defining a specific, unique said second characteristic, the confluence therebetween representing the maximum potentially available said inventory items for the specific said group;

second generating means for generating computer signals of said representative data of said second portion as a second matrix array of n rows and m columns, each said row defining a specific, unique said first characteristic and each said column defining a specific, unique said second characteristic, the confluence therebetween representing the blocked available inventory for the specific said group.

2. The inventory-control system for allocating items of inventory in an optimal manner according to claim 1, wherein said memory means further comprises:

a third portion for storing therein representative data, by said first and second characteristics of each said inventory item, of total inventory items currently available for use;

third generating means for generating computer signals of said representative data of said third portion as a third matrix array of n rows by m columns, each said row defining a specific, unique said first characteristic and each said column defining a specific, unique said second characteristic, the confluence therebetween representing the number of inventory items currently available for use for the specific said group;

a fourth portion for storing therein, by said first and second characteristics of each said inventory item, representative data of the number of inventory items already used;

fourth generating means for generating computer signals of said representative data of said fourth portion as a fourth matrix array of n rows by m columns, each said row defining a specific, unique said first characteristic and each said column defining a specific, unique said second characteristic, the confluence therebetween representing the number of inventory items used of said inventory items for the specific said group;

a fifth portion for storing therein representative data, by said first and second characteristics of each said inventory item, of the blocked inventory items still available for potential use;

fifth generating means for generating computer signals of said representative data of said fifth portion as a fifth matrix array of n rows by m columns, each said row defining a specific, unique said first characteristic and each said column defining a specific, unique said second characteristic, the confluence therebetween representing the number of blocked inventory items rooms still potentially available for the specific said group.

3. The inventory-control system for allocating items of inventory in an optimal manner according to claim 2, wherein said memory means further comprises:

a sixth portion for storing data of said inventory items representative of the desired total maximum items of inventory desired to be used for each said first characteristic, total maximum inventory items desired to be used by each said second characteristic, and total maximum inventory items desired to be used for all of said first and second characteristics combined; and sixth generating means for generating computer signals of said representative data of said sixth portion.

4. The inventory-control system for allocating items of inventory in an optimal manner according to claim 3, wherein said inventory items comprise hotel rooms; each said first characteristic being a rate-category for hotel room, and each said second characteristic being a type of hotel room.

5. The inventory-control system for allocating items of inventory in an optimal manner according to claim 2, wherein said inventory items comprise hotel rooms; each said first characteristic being a rate-category for hotel room, and each said second characteristic being a type of hotel room.

6. The inventory-control system for allocating items of inventory in an optimal manner according to claim 5, wherein each of said means for generating computer signals of representative data comprises means for generating the respective said matrix array of n rows by m columns with each said row defining a specific, unique rate-category, and each said column defining a specific, unique type of room.

7. The inventory-control system for allocating items of inventory in an optimal manner according to claim 1, wherein said inventory items comprise hotel rooms; each said first characteristic being a rate-category for hotel room, and each said second characteristic being a type of hotel room.

8. The inventory-control system for allocating items of inventory in an optimal manner according to claim 7, wherein each of said means for generating computer signals of said representative data comprises means for generating the respective said matrix array of n rows by m columns with each said row defining a specific, unique rate-category, and each said column defining a specific, unique type of room.

9. A computer method of allocating items of inventory in an optimal manner, comprising:
  (a) storing in computer memory data representative of said inventory items by first and second characteristics of each said inventory item, said data being representative of the total maximum inventory of inventory items available for potential use;
  (b) said step (a) comprising storing the data of said inventory items as a plurality of different groups of inventory items, each said group having at least one inventory item therein, each said inventory item in each said group being uniquely characterized from an inventory item in another said group, each said inventory item having a said first characteristic and a said second characteristic, with one of said first and second characteristics thereof being equal to a characteristic of at least one other inventory item of at least one other said group;
  (c) said step (b) comprising generating computer signals of said representative data of said step (a) as a first matrix array of n rows by m columns, each said row defining a specific, unique said first characteristic and each said column defining a specific, unique said second characteristic, the confluence therebetween representing the maximum potentially available said inventory items for the specific said group;
  (d) storing in computer memory data representative of said inventory items by said first and second characteristics of each said inventory item, said data being representative of protected inventory items in said groups;
  (e) said step (d) comprising storing the data of said inventory items as a plurality of different groups of inventory items, each said group having at least one inventory item therein, each said inventory item in each said group being uniquely characterized from an inventory item in another said group, each said inventory item having a first characteristic and a second characteristic, with one of said first and second characteristics thereof being equal to a characteristic of at least one other inventory item of at least one other said;
  (f) said step (e) comprising generating computer signals of said representative data of said step (d) as a first matrix array of n rows by m columns, each said row defining a specific, unique said first characteristic and each said column defining a specific, unique said second characteristic, the confluence therebetween representing the blocked available inventory for the specific said group.

10. The method according to claim 9, further comprising:
  (g) storing in computer memory data representative of said inventory items by said first and second characteristics of each said inventory item, said data being representative of the total inventory items currently available for use;
  (h) said step (g) comprising storing the data of said inventory items as a plurality of different groups of inventory items, each said group having at least one inventory item therein, each said inventory item in each said group being uniquely characterized from an inventory item in another said group, each said inventory item having a said first characteristic and a said second characteristic, with one of said first and second characteristics thereof being equal to a characteristic of at least one other inventory item of at least one other said group;
  (i) said step (h) comprising generating computer signals of said representative data of said step (g) as a first matrix array of n rows by m columns, each said row defining a specific, unique said first characteristic and each said column defining a specific, unique said second characteristic, the confluence therebetween representing the number of inventory items currently available for use for the specific said group;
  (j) storing in computer memory data representative of said inventory items by first and second characteristics of each said inventory item, said data being representative of the number of inventory items already used;
  (k) said step (j) comprising storing the data of said inventory items as a plurality of different groups of inventory items, each said group having at least one inventory item therein, each said inventory item in each said group being uniquely characterized from an inventory item in another said group, each said inventory item having a said first characteristic and a said second characteristic, with one of said first and second characteristics thereof being equal to a characteristic of at least one other inventory item of at least one other said group;
  (i) said step (k) comprising generating computer signals of said representative data of said step (j) as a first matrix array of n rows by m columns, each said row defining a specific, unique said first characteristic and each said column defining a specific, unique said second characteristic, the confluence therebetween representing the number of inventory items already used;
  (m) storing in computer memory data representative of said inventory items by said first and second characteristics of each said inventory item, said data being representative of the blocked inventory items still available for potential use;
  (n) said step (m) comprising storing the data of said inventory items as a plurality of different groups of inventory items, each said group having at least one inventory item therein, each said inventory item in each said group being uniquely characterized from an inventory item in another said group, each said inventory item having a said first characteristic and a said second characteristic, with one of said first and second characteristics thereof being equal to a characteristic of at least one other inventory item of at least one other said group;

(o) said step (n) comprising generating computer signals of said representative data of said step (m) as a first matrix array of n rows by m columns, each said row defining a specific, unique said first characteristic and each said column defining a specific, unique said second characteristic, the confluence therebetween being representative of the blocked inventory items still available for potential use.

11. The method according to claim 10, further comprising:

(p) storing in computer memory data representative of said inventory items by said first and second characteristics of each said inventory item, said data being representative of the desired total maximum items of inventory desired to be used for each said first characteristic, total maximum inventory items desired to be used by each said second characteristic, and total maximum inventory items desired to be used for all of said first and second characteristics combined;

(q) said step (p) comprising storing the data of said inventory items as a plurality of different groups of inventory items, each said group having at least one inventory item therein, each said inventory item in each said group being uniquely characterized from an inventory item in another said group, each said inventory item having a said first characteristic and a said second characteristic, with one of said first and second characteristics thereof being equal to a characteristic of at least one other inventory item of at least one other said group;

(r) said step (q) comprising generating computer signals of said representative data of said step (p) as a first matrix array of n rows by m columns, each said row defining a specific, unique said first characteristic and each said column defining a specific, unique said second characteristic, the confluence therebetween representing the desired total maximum items of inventory desired to be used for each said first characteristic, total maximum inventory items desired to be used by each said second characteristic, and total maximum inventory items desired to be used for all of said first and second characteristics combined.

12. The method according to claim 11, wherein each said step (a), (d), (g), (j), (m) and (p) comprises storing hotel rooms as the inventory items; each said first characteristic being a rate-category for hotel room, and each said second characteristic being a type of hotel room.

13. The method according to claim 10, wherein each said step (a), (d), (g) and (j) comprises storing hotel rooms as the inventory items; each said first characteristic being a rate-category for hotel room, and each said second characteristic being a type of hotel room.

14. The method according to claim 9, wherein each said step (a) and (d) comprises storing hotel rooms as the inventory items; each said first characteristic being a rate-category for hotel room, and each said second characteristic being a type of hotel room.

* * * * *